US012653166B2

(12) United States Patent
Ostmeyer et al.

(10) Patent No.: US 12,653,166 B2
(45) Date of Patent: Jun. 16, 2026

(54) LIVEWELL SYSTEM AND METHODS OF USE

(71) Applicant: iKon Boats, LLC, Vonore, TN (US)

(72) Inventors: Matthew Ostmeyer, Maryville, TN (US); Mike Myers, Knoxville, TN (US); Brent Brenon Butler, Vonore, TN (US); Joel Chaplin, Maryville, TN (US); Ryan Garrison, Knoxville, TN (US); Cameron O'Connell, Knoxville, TN (US); Edgar Miller, Kingston, TN (US); Andrew Clements, Philadelphia, TN (US); Tommy Conner, Sweetwater, TN (US)

(73) Assignee: iKon Boats, LLC, Vonore, TN (US)

( * ) Notice: Subject to any disclaimer, the term of this patent is extended or adjusted under 35 U.S.C. 154(b) by 168 days.

(21) Appl. No.: 18/063,553

(22) Filed: Dec. 8, 2022

(65) Prior Publication Data

US 2023/0180723 A1    Jun. 15, 2023

Related U.S. Application Data

(60) Provisional application No. 63/265,171, filed on Dec. 9, 2021.

(51) Int. Cl.
*A01K 63/02*      (2006.01)
*A01K 63/04*      (2006.01)
*A01K 63/06*      (2006.01)
*A01K 97/20*      (2006.01)

(52) U.S. Cl.
CPC ............ *A01K 63/02* (2013.01); *A01K 63/047* (2013.01); *A01K 63/065* (2013.01); *A01K 97/20* (2013.01)

(58) Field of Classification Search
CPC .... A01K 63/02; A01K 63/047; A01K 63/065; A01K 97/20; A01K 97/05; G05D 9/02; G05D 9/04; G05D 9/12
USPC ....... 43/56, 57; 119/201–203, 226–228, 245, 119/269
See application file for complete search history.

(56) References Cited

U.S. PATENT DOCUMENTS

| | | | |
|---|---|---|---|
| 1,912,896 A | | 6/1933 | Hiller |
| 2,233,564 A | * | 3/1941 | West ...................... A01K 63/02 |
| | | | 43/56 |
| 3,078,612 A | | 2/1963 | Wait |
| 3,084,472 A | | 4/1963 | Feik |

(Continued)

FOREIGN PATENT DOCUMENTS

WO      WO-2019237187 A1 * 12/2019

*Primary Examiner* — Katelyn T Truong
(74) *Attorney, Agent, or Firm* — Bookoff McAndrews, PLLC

(57)      ABSTRACT

Disclosed are livewell systems and methods of operating livewell systems. A livewell system may include a livewell tank having a chamber formed therein, a fill sensor configured to detect a fill level of the chamber, an intake pump configured to selectively convey water into the chamber, and a control unit including a processor and a memory storing instructions. The processor may be configured to execute the instructions to receive a fill signal, determine whether the chamber is filled to a predetermined fill level; and in response to the fill signal and a determination that the chamber is not filled to the predetermined fill level, cause the intake pump to convey water into the chamber.

23 Claims, 16 Drawing Sheets

100

(56) References Cited

U.S. PATENT DOCUMENTS

| | | | |
|---|---|---|---|
| 3,168,887 A * | 2/1965 | Bodell | A01K 63/02 |
| | | | 206/0.5 |
| 3,236,206 A * | 2/1966 | Willinger | A01K 63/02 |
| | | | 62/457.2 |
| 3,710,502 A | 1/1973 | Bracey | |
| 3,800,462 A | 4/1974 | Coyle | |
| 3,815,277 A | 6/1974 | Murray | |
| 3,822,498 A | 7/1974 | Butler | |
| 3,878,807 A * | 4/1975 | Reskusic | B63B 13/02 |
| | | | 114/198 |
| 4,033,280 A | 7/1977 | Wood et al. | |
| 4,074,651 A | 2/1978 | Arduser | |
| 4,166,086 A | 8/1979 | Wright | |
| 4,168,590 A | 9/1979 | Beshoner | |
| 4,255,360 A | 3/1981 | Jeffries | |
| 4,261,131 A | 4/1981 | Poffenberger | |
| 4,357,902 A * | 11/1982 | Sheldon | A01K 63/02 |
| | | | 119/202 |
| 4,462,180 A | 7/1984 | Scott | |
| 4,615,137 A | 10/1986 | Radmanovich | |
| 4,677,785 A | 7/1987 | Lambourn | |
| 4,712,327 A | 12/1987 | Ross et al. | |
| 4,748,765 A | 6/1988 | Martin | |
| 4,766,691 A | 8/1988 | Lynn | |
| 4,776,127 A | 10/1988 | Jackson | |
| 4,815,411 A | 3/1989 | Burgess | |
| 4,821,445 A | 4/1989 | Bass | |
| 4,829,698 A | 5/1989 | McDonald | |
| 4,832,073 A | 5/1989 | Campau | |
| 4,865,776 A | 9/1989 | Campau | |
| 4,927,568 A | 5/1990 | Campau | |
| 4,936,043 A | 6/1990 | Steele | |
| 4,945,672 A | 8/1990 | Raia | |
| 4,970,982 A | 11/1990 | Martin | |
| 4,994,177 A | 2/1991 | Bogar, Jr. | |
| 5,010,681 A | 4/1991 | Cox, Jr. | |
| 5,010,836 A | 4/1991 | Riviezzo | |
| 5,100,543 A | 3/1992 | Stauffer et al. | |
| 5,172,511 A | 12/1992 | Smith et al. | |
| 5,231,789 A | 8/1993 | Radmanovich | |
| 5,294,840 A | 3/1994 | Vellenga et al. | |
| 5,372,084 A | 12/1994 | Mallory | |
| 5,483,227 A * | 1/1996 | Kuo | G01F 23/74 |
| | | | 340/623 |
| 5,538,406 A | 7/1996 | Siegal et al. | |
| 5,582,777 A | 12/1996 | Vento | |
| 5,632,220 A | 5/1997 | Vento | |
| 5,732,657 A * | 3/1998 | Idbeis | A01K 63/047 |
| | | | 119/257 |
| 5,799,435 A | 9/1998 | Stafford | |
| 5,822,916 A | 10/1998 | Power | |
| 5,876,639 A | 3/1999 | Campau | |
| 5,890,939 A * | 4/1999 | Cotton | B63B 13/02 |
| | | | 440/88 M |
| 5,996,977 A | 12/1999 | Burgess | |
| 6,038,993 A | 3/2000 | Vento | |
| 6,044,901 A | 4/2000 | Basala | |
| 6,101,759 A | 8/2000 | Power | |
| 6,119,476 A | 9/2000 | Slaughter et al. | |
| 6,192,820 B1 | 2/2001 | Anderson et al. | |
| 6,244,219 B1 | 6/2001 | Krum | |
| 6,442,888 B1 | 9/2002 | Morrow | |
| 6,557,492 B1 * | 5/2003 | Robohm | A01K 63/02 |
| | | | 119/261 |
| 6,640,749 B1 * | 11/2003 | Monnier | A01K 63/02 |
| | | | 119/201 |
| 6,655,663 B2 | 12/2003 | Vento | |
| 6,810,617 B1 | 11/2004 | Burroughs et al. | |
| 6,962,019 B1 | 11/2005 | McDougle | |
| 7,024,814 B1 | 4/2006 | McDougle | |
| 7,134,293 B2 | 11/2006 | Rabal | |
| 7,423,243 B2 | 9/2008 | Reusche et al. | |
| 7,484,476 B2 | 2/2009 | Stafford | |
| 7,611,130 B2 | 11/2009 | Sylvester | |
| 7,644,535 B2 | 1/2010 | Sloop | |
| 7,958,667 B1 | 6/2011 | Pallack | |
| 8,002,245 B2 | 8/2011 | Sylvester | |
| 8,281,729 B1 | 10/2012 | Beck | |
| 8,505,489 B2 | 8/2013 | Lyngstad | |
| 8,506,811 B2 | 8/2013 | Bradley et al. | |
| 8,572,889 B1 | 11/2013 | Hughes et al. | |
| 8,813,685 B2 | 8/2014 | Vento | |
| 8,833,734 B2 | 9/2014 | Patel | |
| 9,220,250 B1 | 12/2015 | Davis | |
| 9,345,238 B1 | 5/2016 | Higginbotham | |
| 9,392,781 B2 | 7/2016 | Quast | |
| 9,801,361 B2 | 10/2017 | Baker | |
| 10,246,174 B2 | 4/2019 | Stimmel et al. | |
| 10,287,153 B1 * | 5/2019 | Langiano | F16K 5/06 |
| 11,178,857 B1 * | 11/2021 | Greenia | A01K 63/047 |
| 11,464,214 B1 * | 10/2022 | Sethi | A01K 63/047 |
| 2003/0033746 A1 | 2/2003 | Johnson et al. | |
| 2004/0118359 A1 | 6/2004 | Badell | |
| 2005/0031770 A1 * | 2/2005 | Knauf | A23L 3/36 |
| | | | 426/643 |
| 2005/0204610 A1 | 9/2005 | Bogart et al. | |
| 2006/0191828 A1 * | 8/2006 | Cummins | B01D 33/11 |
| | | | 119/260 |
| 2007/0068063 A1 | 3/2007 | Simpson | |
| 2008/0028667 A1 | 2/2008 | Grzybowski | |
| 2009/0071170 A1 | 3/2009 | Totman | |
| 2009/0188152 A1 | 7/2009 | Davin | |
| 2011/0062605 A1 | 3/2011 | Takada | |
| 2012/0085019 A1 | 4/2012 | Link | |
| 2012/0223152 A1 | 9/2012 | Hairgrove | |
| 2012/0291335 A1 | 11/2012 | Brooke et al. | |
| 2013/0036984 A1 * | 2/2013 | Kuhn | A01K 63/04 |
| | | | 119/248 |
| 2015/0377549 A1 | 12/2015 | Cai et al. | |
| 2017/0086440 A1 | 3/2017 | Via, Jr. | |
| 2017/0118964 A1 * | 5/2017 | Tsai | A01K 63/047 |
| 2017/0215401 A1 | 8/2017 | Ellis, II | |
| 2017/0223941 A1 | 8/2017 | Cornwell | |
| 2017/0303516 A1 | 10/2017 | Baker | |
| 2018/0153144 A1 | 6/2018 | Baker | |
| 2018/0187135 A1 * | 7/2018 | Floridia | C12G 1/0216 |
| 2018/0365246 A1 | 12/2018 | Laster et al. | |
| 2019/0176954 A1 | 6/2019 | Stimmel et al. | |
| 2019/0343091 A1 * | 11/2019 | Weiner | A01K 63/04 |
| 2020/0047109 A1 | 2/2020 | Maxwell | |
| 2020/0236912 A1 | 7/2020 | Hedges et al. | |
| 2020/0253171 A1 | 8/2020 | Bement | |
| 2021/0284293 A1 | 9/2021 | Garringer et al. | |
| 2023/0135266 A1 * | 5/2023 | Cox, Jr. | A01K 63/047 |
| | | | 119/245 |

* cited by examiner

1302 — RECEIVE RECIRCULATION SIGNAL WITH PREDETERMINED OXYGENATION LEVEL FROM USER INTERFACE

1304 — DETERMINE TEMPERATURE OF WATER IN CHAMBER

1306 — DETERMINE RECIRCULATION PUMP CYCLE FOR ACHIEVING PREDETERMINED OXYGENATION LEVEL

1308 — RUN RECIRCULATION PUMP ACCORDING TO RECIRCULATION PUMP CYCLE

1300

1400

LIVEWELL SYSTEM AND METHODS OF USE

CROSS-REFERENCE TO RELATED APPLICATION

This application claims priority to U.S. Provisional Patent Application No. 63/265,171, filed on Dec. 9, 2021, which is hereby incorporated by reference in its entirety.

TECHNICAL FIELD

Various embodiments of the present disclosure relate generally to livewell systems used for marine vessels and methods for operating livewell systems.

BACKGROUND

For catch-and-release fishing competitions, anglers frequently use fishing boats equipped with livewells to store the live fish they catch in water. Anglers often aim to keep the fish they catch alive and healthy long enough to show them to competition judges and safely return the fish to the water thereafter without harming them. Existing livewell systems, however, lack the capabilities necessary to reliably and efficiently maintain the caught fish without excessive involvement by the angler, and existing livewell systems may increase fish morbidity or mortality after their release.

The present disclosure is directed to overcoming one or more of these above-referenced challenges.

SUMMARY OF THE DISCLOSURE

According to certain aspects of the disclosure, livewell systems and methods for operating livewell systems are described.

In one example, the livewell system may include: a livewell tank having a chamber formed therein; a fill sensor configured to detect a fill level of the chamber; an intake pump configured to selectively convey water into the chamber; and a control unit including a processor and a memory storing instructions. The processor may be configured to execute the instructions to: receive a fill signal; determine whether the chamber is filled to a predetermined fill level; in response to the fill signal and a determination that the chamber is not filled to the predetermined fill level, cause the intake pump to convey water into the chamber; and in response to a determination that the chamber is filled to the predetermined fill level, possibly after a delay period, cause the intake pump to cease conveying water into the chamber.

In another example, a non-transitory computer readable medium may store instructions that, when executed by a processor, perform a method of controlling a livewell system. The method may include: receiving a fill signal from a user interface; determining, via a fill sensor operably operatively coupled to one of (1) a chamber within a livewell tank body and (2) a conduit in fluid communication with the livewell tank, whether the chamber is filled to a predetermined fill level; in response to the fill signal and a determination that the chamber is not filled to the predetermined fill level, causing an intake pump to convey water into the chamber; and in response to a determination that the chamber is filled to the predetermined fill level, possibly after a delay period, causing the intake pump to cease conveying water into the chamber.

In a further example, a livewell system may include: a user interface including a display; a livewell tank having at least one chamber formed therein; a fill sensor configured to detect a fill level of the at least one chamber; an intake pump configured to selectively convey water into the at least one chamber; an additive reservoir configured to contain an additive; an additive pump configured to selectively convey the additive into the at least one chamber; a recirculation conduit in fluid communication with the at least one chamber; a recirculation pump configured to selectively circulate fluid from the at least one chamber into the recirculation conduit and back into the at least one chamber; and a control unit including a processor and a memory storing instructions and a lookup table. The processor may be configured to execute the instructions to: receive a fill signal from the user interface, the fill signal including additive proportioning information indicative of a predetermined additive ratio; determine whether the at least one chamber is filled to a predetermined fill level; in response to the fill signal and a determination that the at least one chamber is not filled to the predetermined fill level, cause the intake pump to convey water into the at least one chamber; determine, based on the additive proportioning information and the lookup table, an additive pump cycle to achieve the predetermined additive ratio; while the intake pump is conveying water into the at least one chamber, cause the additive pump to convey additive into the at least one chamber according to the additive pump cycle to form a mixture of water and additive; in response to a determination that the at least one chamber is filled to the predetermined fill level, cause the intake pump and the additive pump to cease conveying water and additive into the at least one chamber; and in response to the determination that the at least one chamber is filled to the predetermined fill level, cause the recirculation pump to circulate the mixture through the recirculation conduit.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate generally to livewell systems and methods for operating livewell systems.

Livewell systems have become ubiquitous in catch-and-release fishing competitions during which anglers catch fish and temporarily maintain them in a livewell. Keeping the fish healthy, however, requires optimizing the temperature, salinity, and oxygenation of the livewell water, as well as ensuring that the livewell is appropriately filled so that the fish are not damaged due to sloshing during movement of the boat. Ideally, anglers strive to release the fish back into the water in not only a live condition, but in a condition in which the fish are likely to continue to survive long after being released. For example, fish have a protective coating of slime that acts as a barrier to protect the fish from infection, parasites, or other environmental hazards. This protective coating may be negatively impacted if livewell conditions are not properly managed, which may negatively impact the wellbeing of the fish once released. In some instances, such impact could include a delayed mortality, in which the fish dies due to ailments otherwise prevented by the natural healthy slime coating.

Existing livewell systems lack sufficient control over the aforementioned variables and require anglers to continuously monitor some or all of the aforementioned variables, making adjustments as necessary. Further, current livewell systems may not allow an angler to sufficiently detect or control these variables. To the extent the angler is charged with maintaining the health and safety of the fish in this manner, the angler's attention may be distracted from the actual competitive fishing, thereby impacting performance.

Accordingly, a need exists to address the foregoing challenges. In particular, a need exists for improved livewell systems and improved methods of operating the same. Embodiments of this disclosure offer technical solutions to address one or more of the foregoing needs, as well as other needs.

While this disclosure describes the systems and methods with reference to livewells for use in fishing, it should be appreciated that the present systems and methods may be applicable to other marine systems configured to maintain marine life.

Figure 1:
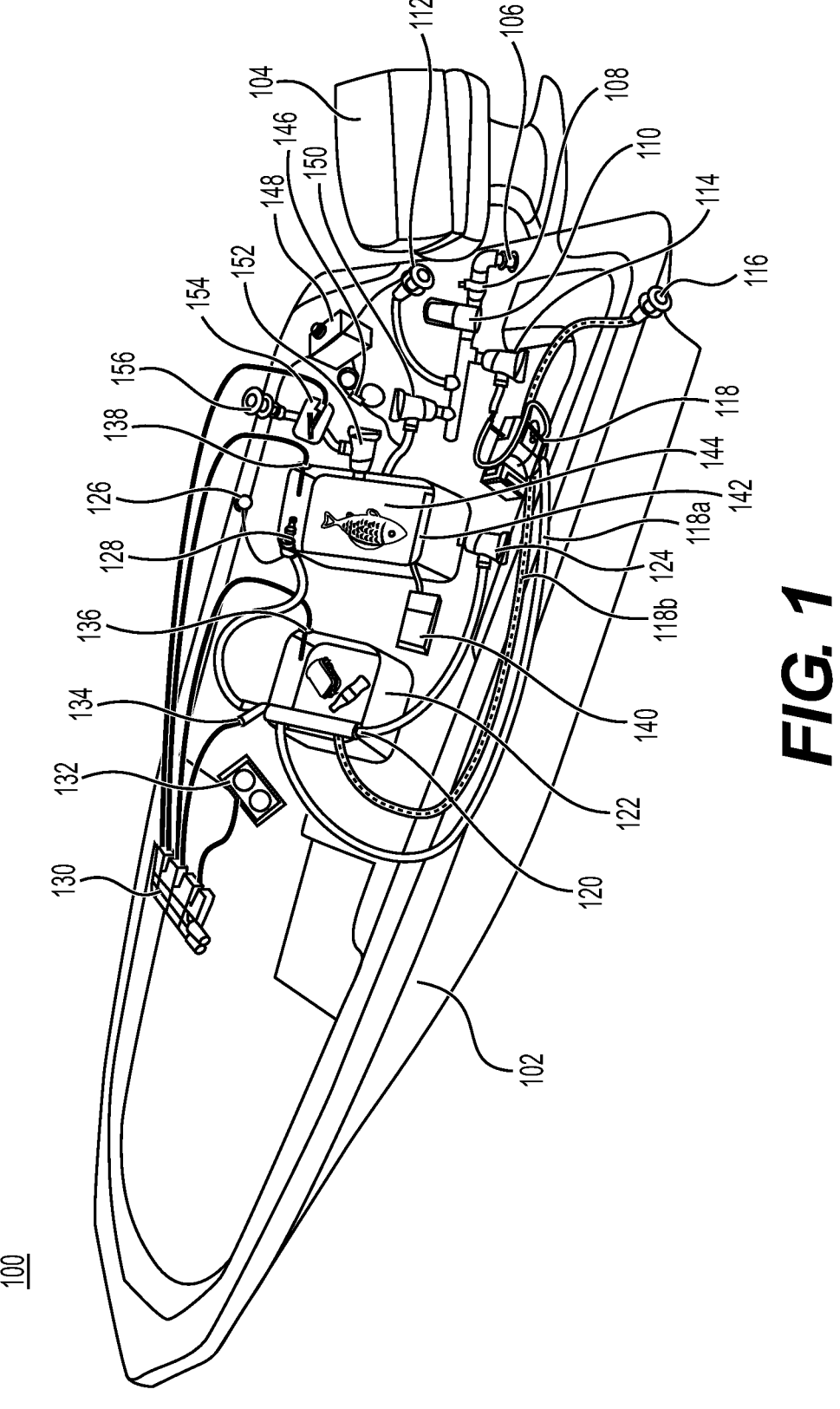
FIG. 1 depicts a schematic diagram of a livewell system, according to one or more embodiments.

FIG. 1 illustrates an exemplary livewell system 100 that may include a heat exchanger, according embodiments of the present disclosure. Livewell system 100 may include a vessel 102 in which other components of the livewell system 100 are arranged. Vessel 102 may include a motor 104, which may be any type of suitable marine motor, such as an inboard motor, an outboard motor, and the like. In some embodiments, vessel 102 may be a specialized fishing boat. Vessel 102, however, need not be limited to a fishing boat and may be any other type of boat or marine vessel. Moreover, vessel 102 may be suitable for use in fresh water, salt water, brackish water, or in any other type of waterway or body of water.

Livewell system 100 may include a livewell tank 144. Livewell tank 144 may have at least one chamber formed therein configured to contain water and configured to receive fish or other marine life therein. In some embodiments, livewell tank 144 may include a plurality of chambers. In some embodiments, livewell tank 144 may include two chambers. In some embodiments, livewell tank 144 may include more than two chambers. The two chambers may be separate such that water does not flow between them. In other embodiments, the two chambers may be in fluid communication with each other such that water flows between them. In embodiments in which the chambers are in fluid communication, a porous mesh that allows water to pass through may be positioned between the chambers to limit the movement of fish between chambers. Alternatively, a membrane, a perforated divider, a filter, a baffle, or any combination of the foregoing may be positioned between the chambers. In some embodiments, the chambers may be separated by a wall with openings formed therein to allow water to pass through. The openings may be small enough to inhibit fish from moving between the chambers.

In some embodiments, livewell tank 144 may include baffling toward an upper end of the one or more chambers. When livewell tank 144 is full or nearly full, the baffling may be submerged such that sloshing is inhibited beneath the baffling. Additionally, the internal corners and edges of the one or more chambers of livewell tank 144 may be rounded. The baffling and rounded features may thereby reduce the risk of bodily injury to fish in livewell tank 144.

Livewell tank 144 may include a lid that may be opened and closed from the deck of the vessel 102 to provide access to the chamber. The lid may be shaped or hinged such that when closed, it may come into direct contact with the water when livewell tank 144 is full, thereby reducing or eliminating sloshing inside livewell tank 144. Livewell tank 144 may include a plurality of conduits connected thereto for conveying water and/or other fluids in and out of the chamber. Each of the conduits will be described in greater detail hereinafter.

Livewell system 100 may include a water pick-up 106 positioned through a hull of vessel 102 such that water pick-up 106 is submerged when vessel 102 is on water. Water pick-up 106 may be fluidly connected to an intake conduit that feeds livewell tank 144 and may serve as an inlet for water to be ingested into livewell tank 144. In some embodiments, water pick-up 106 may be a simple manual pickup or a thru-hull. In some embodiments, water pick-up 106 may be an automatic pick-up, may be fixed or retractable, and may be electrically operated or operated by a pull cable. In some embodiments, water pick-up 106 may be a high-speed pickup positioned on a bottom portion of a hull of vessel 102. In some embodiments, vessel 102 may include a plurality of water pick-ups.

A shut-off valve 108 may be positioned adjacent water pick-up 106 on the intake conduit so that the intake conduit may be selectively opened and closed. In some embodiments, shut-off valve 108 may be a manually operated valve, and in some embodiments, shut-off valve 108 may be an electronically operated valve. Further, livewell systems are described throughout this disclosure as including valves for a variety of different purposes. It should be understood that different types of valves may be used interchangeably for the different purposes. For example, valves in accordance with the present disclosure may include manual valves, automatic or electronic valves, check valves (e.g., spring or flapper), pull cable valves, anti-syphon brake valves with vented loops, pop-off valves, or any other suitable types of valves. In some instances, a plug may be substituted for a valve.

A strainer 110 may be positioned between livewell tank 144 and shut-off valve 108 on the intake conduit and may serve to filter debris and particulate matter from water entering the intake conduit. For example, when vessel 102 is on a natural body of water such as a lake or an ocean, underwater plant matter, debris from the bottom surface of the body of water, and other particulate matter may be ingested through water pick-up 106. Strainer 110 may inhibit that particulate matter from passing into components of livewell system 100. Strainer 110 may include a filter, a mesh, and/or a membrane.

An intake pump 150 may be positioned between strainer 110 and livewell tank 144. Intake pump 150 may be an electronic pump configured to convey water ingested through water pick-up 106 through the intake conduit and into livewell tank 144. Intake pump 150 may be a primary mechanism for filling livewell tank 144 with water from a body of water on which vessel 102 may sit. In some embodiments, intake pump 150 may be a non-positive displacement pump. Further, livewell systems are described throughout this disclosure as including pumps for a variety of different purposes. It should be understood that different types of pumps may be used interchangeably for the different purposes. For example, pumps in accordance with the present disclosure may include rotary pumps, positive displacement pumps, non-positive displacement pumps, centrifugal pumps, or diaphragm pumps.

A thru-hull 112 may be operably coupled to the intake conduit between intake pump 150 and water pick-up 106. Thru-hull 112 may be coupled to the intake conduit via a T-fitting or a Y-fitting, for example. Thru-hall 112 may extend through an outer surface of the hull of vessel 102 at a position that is higher than intake pump 150 but lower than livewell tank 144. In some embodiments, thru-hull 112 may extend through the transom. By positioning thru-hall 112 in this way, water may be permitted to enter water pick-up 106 continuously to maintain a supply of water to intake pump 150, while excess pressure at intake pump 150 may be dissipated. For example, if vessel 102 is moving on a body of water at a high rate of speed, water may enter water pick-up 106 at a high pressure and proceed through the intake conduit. Excess pressure may cause the water in the intake conduit to be forced out of the hull via thru-hull 112, instead of through intake pump 150. By releasing excess pressure and water via thru-hull 112, unintentional filling of livewell tank 144 may be inhibited when vessel 102 is at speed. Additionally, such a configuration may allow intake pump 150 to be maintained in a primed state so as to avoid air locking. Additionally, in such a configuration, filling of the livewell tank 144 may be limited to situations in which intake pump 150 is switched on and not merely due to speed of vessel 102. In some aspects, a pop-off valve may be included instead of or in addition to thru-hull 112. In some aspects, a pressure limiting valve (PLV) may be included instead of or in addition to thru-hull 112. Such a pressure limiting valve may be positioned along the intake conduit, for example.

Livewell system 100 may further include an additive reservoir 148 and an additive valve or pump 146. Additive reservoir 148 may be configured to contain an additive that may be added to the water in livewell tank 144 for the health, protection, and/or safety of fish therein. For example, the additive may be a salt additive, an electrolyte additive, a de-chlorination additive, for example, e.g., G-Juice Livewell Treatement, Rejuvenade, Fish IV, or any other suitable additive for livewell water. The additive may be in solution form, liquid form, powder form, tablet form, salt form, saline, form, dissolvable solid form, or any other suitable form for being added to livewell water. Additive valve or pump 146 may be positioned along an additive conduit that is operably coupled to the intake conduit between intake pump 150 and livewell tank 144 such that additive from additive reservoir 148 may enter livewell tank 144 with intake water through the intake conduit. In some embodiments, the additive may enter livewell tank 144 through one or more nozzles or one or more injectors. Additive valve or pump 146 may limit and/or control an amount of additive permitted to flow from additive reservoir 148. In some embodiments, additive valve or pump 146 may be a proportioning valve and may operate such that a selectable proportion of additive and water flows through the intake conduit into livewell tank 144 when livewell tank 144 is being filled. In some embodiments, such a proportioning valve may be a simple, analog valve. In some embodiments, additive valve or pump 146 may be a pump which moves additive from reservoir 148 to livewell tank 144 in a metered fashion based on how long or how fast intake pump 150 is running, the size of an injection port, or any other relevant metric. Additive valve or pump 146 may be configured to dispense solid or liquid additives. For example, additive valve or pump 146 may be configured to dispense an amount of liquid, one or more tablets, or an amount of powder.

Livewell system 100 may also include a drain pump 152 configured to drain water from livewell tank 144. Similar to intake pump 150, drain pump 152 may be an electronic pump. Drain pump 152 may be operably coupled to a drain conduit in fluid communication with a drain 156. Drain 156 may extend through the hull of vessel 102 such that water pumped from livewell tank 144 passes through drain 156 out of vessel 102. Drain 156 may further be positioned at a height above the top of livewell tank 144, for example, near the gunwale of vessel 102. Positioning drain 156 accordingly may allow convenient collection of livewell water by the angler for use in transporting fish. Positioning drain 156 above the top of livewell tank 144 may inhibit water from being drained unintentionally from livewell tank 144 due to gravity. Positioning drain 156 above the top of livewell tank 144 may further allow livewell tank 144 to be completely, or nearly completed filled such that little or no air remains in livewell tank 144. In other words, livewell tank 144 may be filled up to the lid(s) on the top thereof and slightly beyond such that a column of water is pushed into the drain conduit. Filling the livewell tank 144 in this manner may reduce sloshing within livewell tank 144 and prevent harm to any fish therein.

A fill sensor 154 may be positioned along the drain conduit at a height near or slightly above a height of the top of livewell tank 144. In some embodiments, fill sensor 154 may be a float sensor, a capacitive sensor, a resistive sensor, a hydrostatic sensor, or a pressure sensor, for example. In some embodiments, fill sensor 154 may include one or more float switches, such as a capacitive float switch, resistive float switch, mechanical float switch, hydrostatic float switch, tethered float switch, vertical mount float switch, horizontal mount float switch, diaphragm float switch, or electronic float switch. In some embodiments, fill sensor 154 may include a hydrostatic pressure sensor, pressure transducer, pressure transmitter, strain gauge, potentiometric sensor, inductive sensor, piezoelectric sensor, variable reluctance sensor, barometer, vacuum, or the like. As the drain conduit is in fluid communication with the chamber of livewell tank 144, a signal from fill sensor 154 may serve as a proxy for a fill level within the chamber. Positioning fill sensor 154 in the drain conduit as opposed to positioning fill sensor 154 directly in the chamber of livewell tank 144 may insulate fill sensor 154 from motion of vessel 102 due to waves, wakes, or the like, thereby reducing noise in the signal of fill sensor 154 from sloshing. In some embodiments, fill sensor 154 may be a simple float switch that is configured to interrupt a power supply to intake pump 150.

Livewell system 100 may include a recirculation pump 124 configured to circulate water from livewell tank 144 through a recirculation conduit outside of the livewell tank 144 and ultimately return the water to livewell tank 144. Similar to the pumps mentioned herein previously, recirculation pump 124 may be an electronic pump. An angler may wish to recirculate water in livewell tank 144 by running recirculation pump 124 for any number of reasons, including, but not limited to, one or more of: preventing water in livewell tank 144 from stagnating, cooling the water in livewell tank 144, and aerating and/or oxygenating the water in livewell tank 144. In some embodiments, as described hereinafter, recirculation pump 124 may be controlled by a control unit programmed with specific logic. In some embodiments, recirculation pump 124 may operate in conjunction with a simple analog timer relay. In some embodiments, recirculation pump 124 may operate in conjunction with a proximity sensor.

A heat exchanger 120 may be positioned along the recirculation conduit such that water pumped from livewell tank 144 by recirculation pump 124 passes through heat exchanger 120 before returning to livewell tank 144. In some embodiments, heat exchanger 120 may be positioned within an optional cooler 122 configured to contain food, drinks, ice, and the like. Heat exchanger 120 may receive a coolant from a compressor 118 via cooling inlet 118a. As low-temperature coolant enters heat exchanger 120, it may absorb heat from water circulated through the recirculation conduit before the water is fed back into livewell tank 144, thereby cooling the water. The low-temperature coolant may simultaneously absorb heat from cooler 122, thereby cooling cooler 122. The heated coolant may be returned from heat exchanger 120 via coolant return 118b to compressor 118. Compressor 118 may compress and cool the high-temperature coolant returned via coolant return 118b and then recirculate it back through cooling inlet 118a as low-temperature coolant as part of the cooling cycle. In some embodiments, as described hereinafter, compressor 118 may be controlled by a control unit programmed with specific logic. In some embodiments, compressor 118 may operate in conjunction with a simple bimetal thermostat.

Compressor 118 may itself be cooled by water ingested via water pick-up 106. A compressor cooling pump 114 may be in fluid communication with the intake conduit and configured to convey water to compressor 118. After the water has cooled compressor 118, the warm wastewater may be expelled through a coolant drain 116 extending through the hull of vessel 102.

Heat exchanger 120 and compressor 118 may be part of a water cooling subsystem of a livewell system. It should be understood than either or both of these components may be substituted for or used in conjunction with a similar device, such as a heat pump, a compressor and one or more flush or surface mount freezer plates, air conditioning, an evaporator, an air or water chiller (e.g., a liquid-to-liquid chiller, a closed loop dry chiller, an open loop evaporative chiller, a closed loop evaporative chiller, or a water chiller), a coil-wrapped tub with a compressor, an ice maker, or an ice chipper plumbed to the livewell.

The recirculation conduit may include an aerator nozzle 128 through which recirculated water flows as it returns to livewell tank 144. Aerator nozzle 128 may be a Venturi effect nozzle and may be in fluid communication with an air intake port 126. Air intake port 126 may be positioned anywhere on vessel 102 where it is exposed to ambient air, including, for example, through the hull above the waterline, in the gunwale, or in any other suitable position. As water flows through the recirculation conduit and through aerator nozzle 128, it may flow over a cavity creating a low pressure region. Air may be drawn through air intake port 126 to the cavity where it is infused into the water flowing through the recirculation conduit to oxygenate the water as it enters livewell tank 144. Aerator nozzle 128 may include a flow director to direct the flow of water in a circular path around the walls of livewell tank 144 to promote more even distribution of oxygen within livewell tank 144 and to flow water more evenly across heat exchanger 120.

As an alternative, or in addition, to aerator nozzle 128 and air intake port 126, livewell system 100 may further include an oxygen generator 140. Oxygen generator 140 may be an electronic air pump, a container of compressed air or oxygen, or an electrolysis oxygen generator, for example, and may convey air or oxygen through a bubbler stone 142. Bubbler stone 142 may be positioned within and toward a bottom of the chamber of livewell tank 144 such that it is submerged when livewell tank 144 is filled. Bubbler stone 142 may be, for example, a fine pore bubbler stone. Oxygen generator 140 may convey air through bubbler stone 142 such that it is forced through pores thereof and into water of livewell tank 144, thereby oxygenating the water. Oxygen generator 140 may be desirable because it may not introduce warm, ambient air into the water of livewell tank 144, as could aerator nozzle 128. In some embodiments, livewell system 100 may include a max air passive system.

Livewell system 100 may include one or more various additional sensors arranged throughout the system. For example, a heat exchanger temperature sensor 134 may be positioned downstream of heat exchanger 120 along the recirculation conduit. Heat exchanger temperature sensor 134 may be configured to detect a temperature of water flowing through the recirculation conduit as it exits heat exchanger 120 after being cooled. A cooler temperature sensor 136 may be positioned within cooler 122, if included, and configured to detect of temperature within cooler 122. Similarly, a livewell temperature sensor 138 may be positioned within livewell tank 144 and configured to detect a temperature of the water within livewell tank 144.

Each of the sensors described herein may be connected to a control unit 130. The various sensors may be connected via a wired connection or wireless connection. Control unit 130 may control all electronic systems of vessel 102, such as the livewell system, drive system, lights, and the like, or may alternatively be a dedicated controller for livewell system 100. Control unit 130 may include one or more processors and one or more memories storing instructions. Control unit 130 may further be configured as described hereinafter with reference to FIG. 16. Control unit 130 may receive signals from each of the sensors described. Control unit 130 may further control each of the electronic components of livewell system 100, including the pumps, compressor 118, additive system, and oxygen generator 140, if included. In some embodiments, valves may also be controlled to inhibit unintentional filling or draining of livewell due to siphoning or pressure differential. In some embodiments, control unit 130 may include network communication capabilities. For example, control unit 130 may be configured to have WiFi, Bluetooth, cable, satellite, or any other suitable communication protocol capability. Certain methods of controlling the various electronic components will be described hereinafter with reference to FIGS. 11-13.

Livewell system 100 may also include a user interface 132 operatively connected to control unit 130. User interface 132 may include a display such as an LCD, an LED, a touchscreen, or any other suitable display for displaying information about livewell system 100 to an operator of vessel 102. In some embodiments, user interface 132 may be implemented in a separate device, such as a smartphone, a tablet, a laptop computer, or the like. In such embodiments, the separate device may communicate with control unit 130 via a wireless or wired connection. User interface 132 may further receive inputs from the operator for adjusting operational settings of livewell system 100. For example, the operator may input instructions to fill livewell tank 144, drain livewell tank 144, oxygenate, chill, warm, add an additive to, and/or recirculate the water in livewell tank 144.

Figure 2:
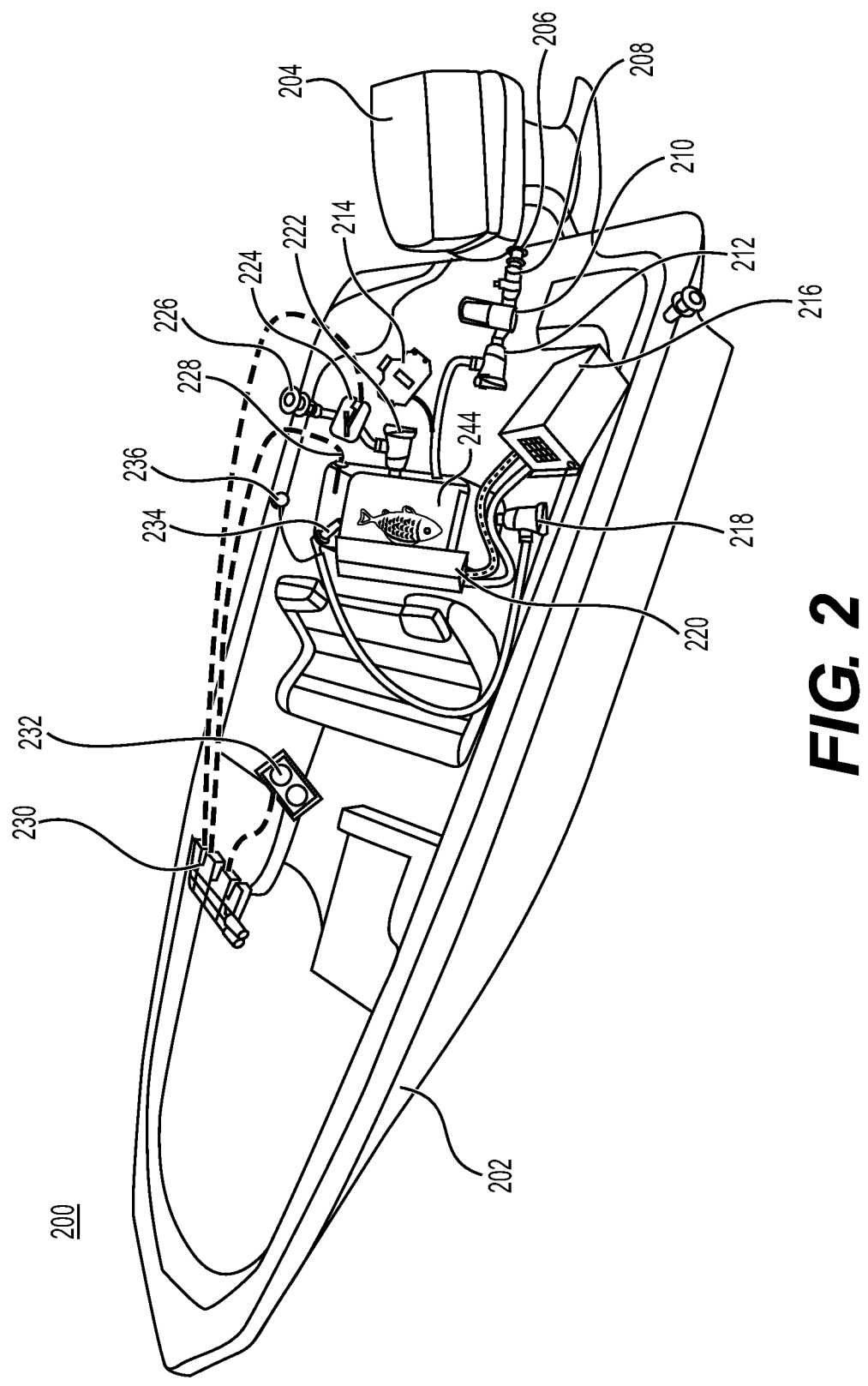
FIG. 2 depicts a schematic diagram of a livewell system, according to one or more embodiments.

FIG. 2 illustrates another exemplary livewell system 200 that may include an evaporator plate, or chiller plate, according embodiments of the present disclosure. Several components of livewell system 200 are similar to components of livewell system 100 described herein previously and will not be described in detail. For example, livewell system 200 may be arranged in a vessel 202 having a motor 204. Livewell system 200 may include a water pick-up 206, a shut-off valve 208, a strainer 210, and an intake pump 212 configured to convey water to livewell tank 244. Livewell system 200 may also include a drain pump 222, a fill sensor 224, and a drain 226. Livewell system 200 may further include a recirculation pump 218 configured to circulate water from livewell tank 244 through a recirculation conduit to an aerator nozzle 234 through which it reenters livewell tank 244. Aerator nozzle 234 may be connected to an air intake port 236 through which air may flow to combine with water reentering livewell tank 244. Additionally, a livewell temperature sensor 228 may be positioned inside livewell tank 244 to detect a temperature of the water therein. A control unit 230 may be included to control the various electronic components of livewell system 200 and to receive signals from the sensors. Information about the livewell system 200 may be displayed on a user interface 232, which may further receive instructions and/or commands from an operator of vessel 202.

In contrast with livewell system 100, livewell system 200 may include an evaporator plate 220 configured to cool livewell tank 244 directly in lieu of heat exchanger 120. In some embodiments, evaporator plate 220 may be positioned outside of livewell tank 244 against a sidewall of livewell tank 244 and in some embodiments, evaporator plate 220 may be incorporated into a sidewall or other portion of livewell tank 244 such that evaporator plate 220 is directly in contact with the water in the chamber. For example, an opening in an inner sidewall of livewell tank 244 may be formed and configured to receive evaporator plate 220. Evaporator plate 220 may seal the opening so as to be water tight. The inner sidewall and evaporator plate 220 may further be encased by an outer sidewall and insulating foam positioned between the inner and outer sidewalls of livewell tank 244. In some aspects, in addition to or instead of evaporator plate 220, the livewell system may incorporate an internal or external chill plate, coil wrap, or heat exchanger, or a combination thereof.

A condenser 216 may circulate low-temperature refrigerant through evaporator plate 220. As the refrigerant passes through evaporator plate 220, the refrigerant may absorb heat from the water in livewell tank 244 and may be converted to vapor. The refrigerant vapor may then return to condenser 216. Condenser 216 may be air cooled rather than water cooled. By incorporating condenser 216 for cooling the water in livewell tank 244, the water in livewell tank 244 can be preconditioned before vessel 202 is launched into a body of water. Thereby, the water in livewell tank 244 may already be cooled when an angler begins catching fish.

Livewell system 200 may further include an additive reservoir 214. Additive reservoir 214 may have a container body and pump integrated therein to convey the additive into livewell tank 244. In contrast with additive reservoir 148, additive reservoir pump of additive reservoir 214 may be pumping additive into livewell tank 244 without the need for manual intervention by the operator. An additive conduit extending from additive reservoir 214 may be operably coupled to the intake conduit such that the additive may be combined with water through the intake conduit as it flows into livewell tank 244. The pump of additive reservoir 214 may be controlled by control unit 230. An example control algorithm for the pump will be described hereinafter with reference to FIG. 12. Alternatively, or in addition, the pump of additive reservoir 214 may be manually controlled such that additive may be added to livewell tank 244 as the operator pleases.

Figure 3:
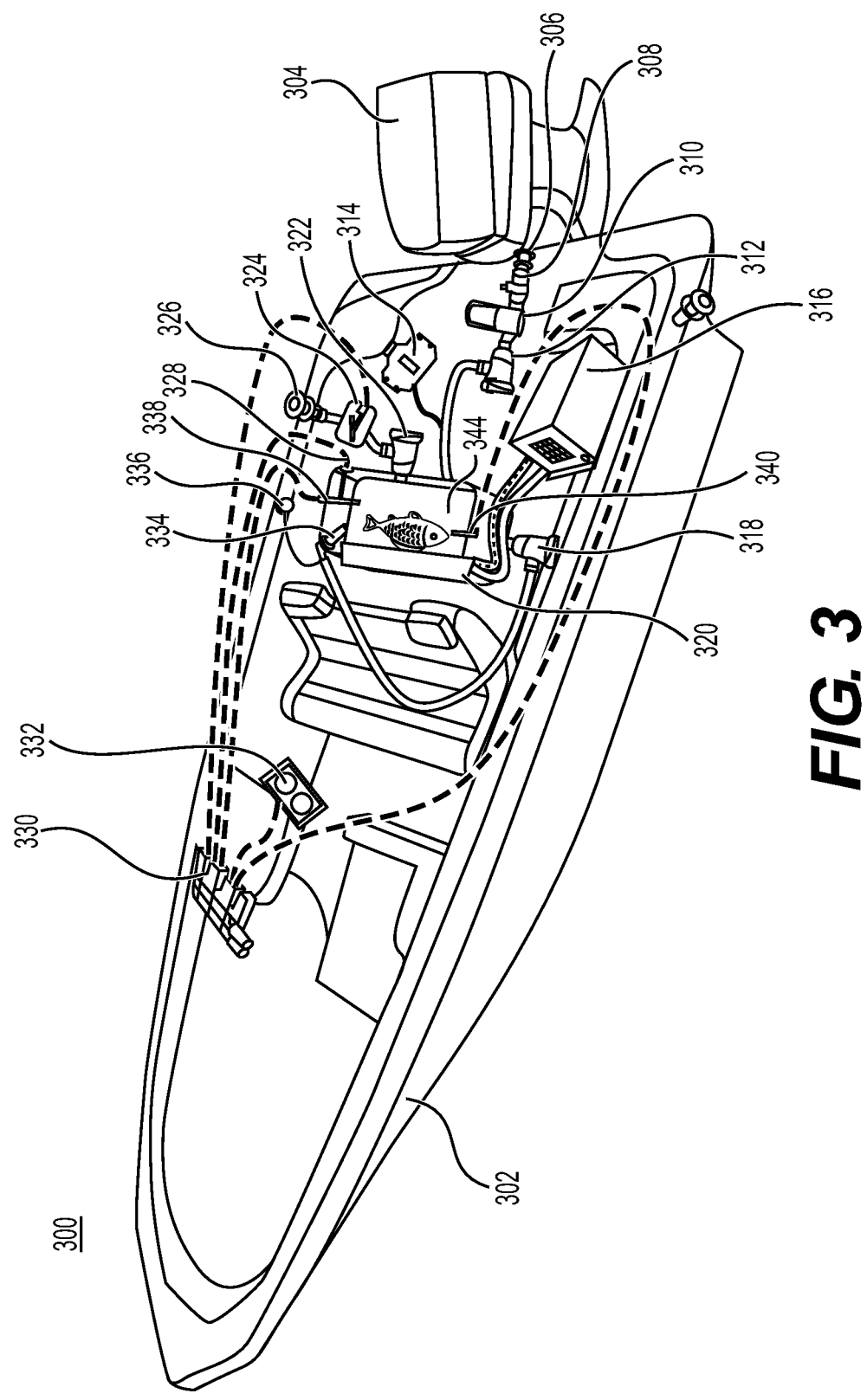
FIG. 3 depicts a schematic diagram of a livewell system, according to one or more embodiments.

FIG. 3 illustrates another exemplary livewell system 300 that may include salinity and oxygenation control features, according to embodiments of the present disclosure. Livewell system 300 may include each of the components of livewell system 200 described herein previously and those components will not be described in detail. For example, livewell system 300 may be arranged in a vessel 302 having a motor 304. Livewell system 300 may include a water pick-up 306, a shut-off valve 308, a strainer 310, and an intake pump 312 configured to convey water to livewell tank 344. Livewell system 300 may also include a drain pump 322, a fill sensor 324, and a drain 326. Livewell system 300 may further include a recirculation pump 318 configured to circulate water from livewell tank 344 through a recirculation conduit to an aerator nozzle 334 through which it reenters livewell tank 344. Aerator nozzle 334 may be connected to an air intake port 336 through which air may flow to combine with water reentering livewell tank 344. Additionally, a livewell temperature sensor 328 may be positioned inside livewell tank 344 to detect a temperature of the water therein. Temperature sensor 328 may be, for example, a thermostat, a bimetal thermostat, a thermistor thermometer, a thermocouple, a resistance temperature detector, or any other suitable sensor. A control unit 330 may be provided to control the various electronic components of livewell system 300 and to receive signals from the sensors. Information about the livewell system 300 may be displayed on a user interface 332 which may further receive instructions and/or commands from an operator of vessel 302. Livewell system 300 may also include an evaporator plate 320 configured to cool livewell tank 344. A condenser 316 may circulate low-temperature refrigerant through evaporator plate 320 to cool livewell tank 344. Livewell system 300 may further include an additive reservoir 314.

In addition to the components included in livewell system 200, livewell system 300 may further include a salinity sensor 338 and an oxygen sensor 340. Each of the salinity sensor 338 and the oxygen sensor 340 may be positioned in the chamber of livewell tank 344. Salinity sensor 338 may be configured to detect a salinity of the water within livewell tank 344 and may be configured to transmit corresponding signals to control unit 330. Oxygen sensor 340 may detect an amount and/or concentration of dissolved oxygen in the water in livewell tank 344 and may be configured to transmit corresponding signals to control unit 330.

Figure 4:
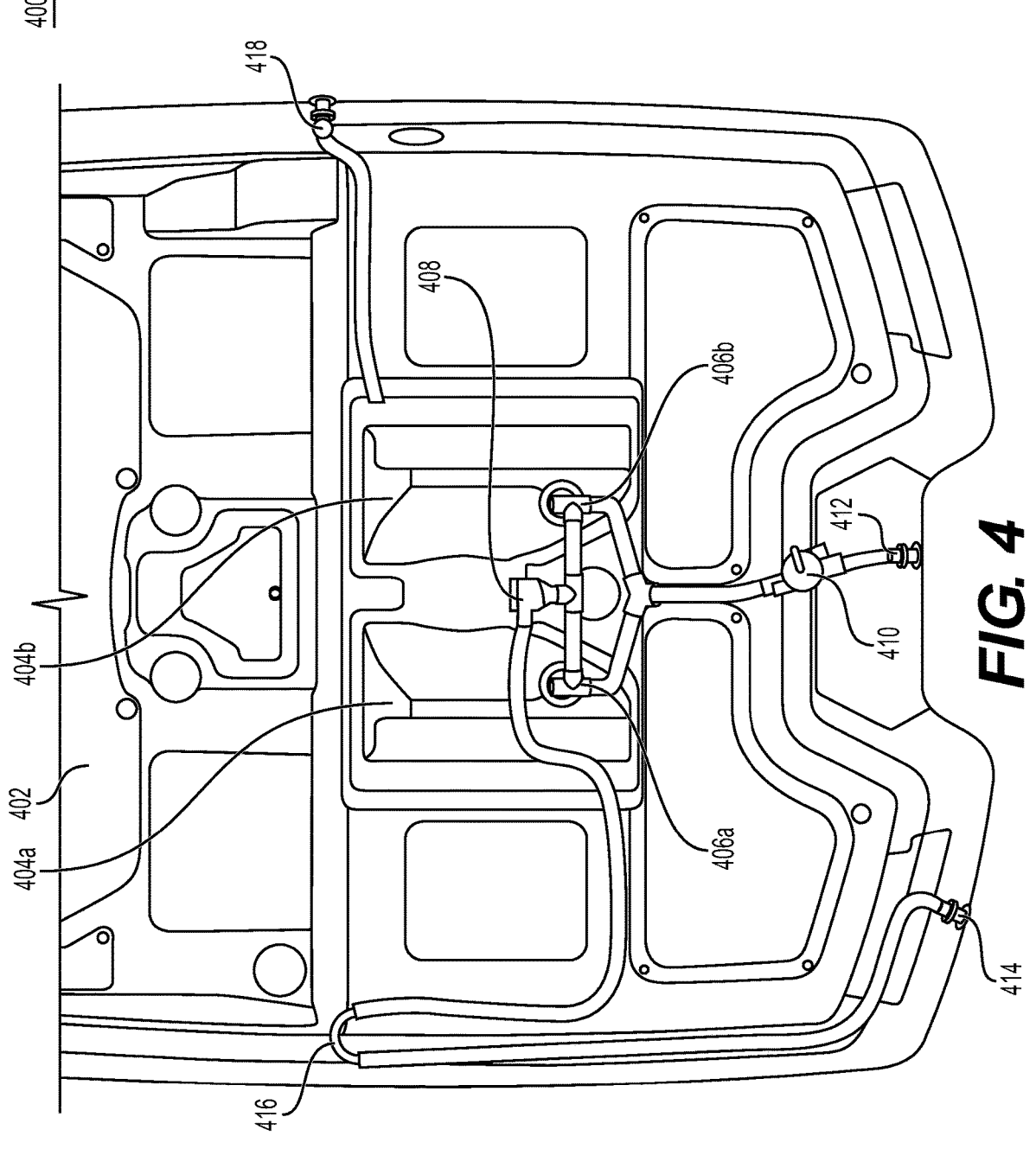
FIG. 4 depicts a schematic diagram of a livewell drain system, according to one or more embodiments.
Figure 5:
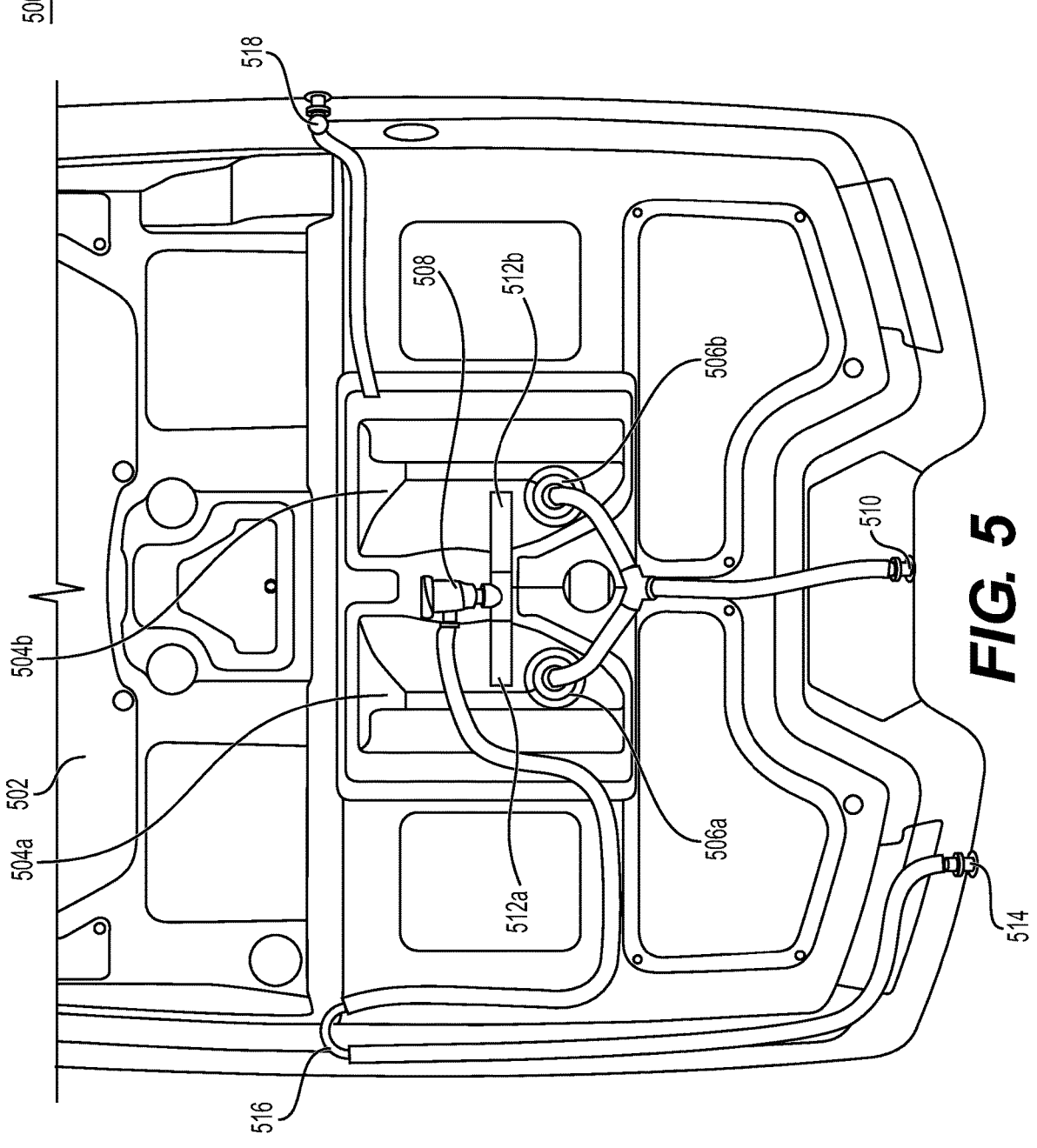
FIG. 5 depicts a schematic diagram of a livewell drain system, according to one or more embodiments.

FIGS. 4 and 5 depict exemplary configurations of livewell drain systems, according to embodiments of the disclosure. Each of FIGS. 4 and 5 show bottom views of the livewell drain systems with the vessel hulls removed.

As shown in FIG. 4, drain system 400 may utilize a manifold and may be arranged on vessel body 402. Drain system 400 may include a livewell tank having chambers 404a and 404b. In some embodiments, chambers 404a and 404b may be separate such that water does not flow between them. In some embodiments, chambers 404a and 404b may be in fluid communication with each other such that water flows between them. In embodiments in which the chambers 404a and 404b are in fluid communication, a porous mesh may be positioned between the chambers 404a and 404b to limit the movement of fish between chambers.

Chambers 404a and 404b may include drain ports 406a and 406b, respectively. Drain ports 406a and 406b may be located on undersides of chambers 404a and 404b toward the bottoms thereof. A drain pump 408 may be connected to both of drain ports 406a and 406b via a manifold. Drain pump 408 may be configured to convey water from chambers 404a and 404b via a main drain conduit out of the hull through main drain outlet 414. In some embodiments, drain pump 408 may be positioned above drain ports 406a and 406b to inhibit drain pump 408 from becoming air-locked.

Main drain conduit may include an anti-siphon vent 416 above drain pump 408 and/or main drain outlet 414. Anti-siphon vent 416 may be arranged, for example, near an underside of the gunwale of vessel body 402. Anti-siphon vent 416 may inhibit a siphon from forming in main drain conduit such that a flow of water out of chambers 404a and 404b may be stopped and started as desired. Absent anti-siphon vent 416, it may not be possible to stop water flowing through the main drain conduit until chambers 404a and 404b are empty. In addition to, or instead of, anti-siphon vent 416, valves and/or positive displacement pumps may be incorporated, which may be manual or automatically controlled.

In addition to drain pump 408, drain ports 406a and 406b may also be connected to a gravity drain outlet 412 via a gravity drain conduit. Gravity drain outlet 412 may be positioned lower on vessel body 402 than drain ports 406a and 406b such that water from chambers 404a and 404b may flow out of gravity drain outlet 412 due to gravity. A gravity drain valve 410 may be positioned downstream from drain ports 406a and 406b and upstream from gravity drain outlet 412 such that the gravity drain conduit may be selectively opened and closed. Draining chambers 404a and 404b via gravity drain outlet 412 may be useful in situations when vessel body 402 is out of the water, for example, at the end of the day or to prepare vessel body 402 for storage. In some embodiments, gravity drain valve 410 may be a remotely actuated valve controllable by the control unit. In some embodiments, gravity drain valve 410 may be a mechanical valve and may be actuated either by pulling a cable that is accessible on the vessel body 402 or by accessing gravity drain valve 410 directly.

In some embodiments, gravity drain valve 410 may be a manually operated valve. For example, a pull cable may be connected to a toggle switch of gravity drain valve 410 and made accessible to an operator of the vessel. In some embodiments, gravity drain valve 410 may be an electronically controlled valve that may be toggled via the user interface and control unit. Even if configured for electronic control, gravity drain valve 410 may also be capable of manual operation, so that a user may control gravity drain valve 410 either electrically or manually. In some embodiments, gravity drain valve 410 may be a ball valve or another type of valve configured to allow gravity drain conduit to be easily flushed and/or cleaned.

Drain system 400 may further include an overflow outlet 418. Overflow outlet 418 may be positioned through the hull of the vessel body 402 near or above the top of chambers 404a and 404b. Overflow outlet 418 may be in fluid communication with chamber 404a and/or chamber 404b and allow excess gas and/or water to escape. For example, with the lids of chambers 404a and 404b closed, overflow outlet 418 may allow a pressure within chambers 404a and 404b to equalize to ambient pressure during filling and/or draining. In some embodiments, a float switch may be positioned between overflow outlet 418 and chambers 404a and 404b, as discussed herein previously with respect to FIGS. 1-3.

FIG. 5 illustrates another exemplary livewell drain system 500 having a separated gravity drain configuration, according embodiments of the present disclosure. Livewell drain system 500 may include several of the same components as livewell drain system 400 described herein previously, and those components will not be described in detail. For example, livewell drain system 500 may be arranged on a vessel body 502 and may include chambers 504a and 504b. Chambers 504a and 504b may include drain ports 506a and 506b, respectively. Livewell drain system 500 may further include a main drain pump 508 configured to convey water from chambers 504a and 504b through a main drain conduit having an anti-siphon vent 516 through a main drain outlet 514. Livewell drain system 500 may further include a gravity drain outlet 510 and an overflow outlet 518.

In addition to the components of drain system 400, livewell drain system 500 may additionally include pump ports 512a and 512b. Pump ports 512a and 512b may be outlets from chambers 504a and 504b, respectively, distinct from drain ports 506a and 506b. Specifically, pump 508 may be configured to convey water from the chambers 504a and 504b through pump ports 512a and 512b and out of the vessel through main drain outlet 514.

By including pump ports 512a and 512b in addition to drain ports 506a and 506b, a need for a gravity drain valve downstream from drain ports 506a and 506b may be eliminated. Instead, drain ports 506a and 506b may be selectively opened and closed using, for example, rubber plugs configured to be accessed through the tops of chambers 504a and 504b by the operator of the vessel, or valves internal or external to the chamber.

FIGS. 6-9 show exemplary configurations of livewell fill and recirculation systems. Each of FIGS. 6-9 show bottom views of the respective livewell fill and recirculation systems with the vessel hulls removed.

Figure 6:
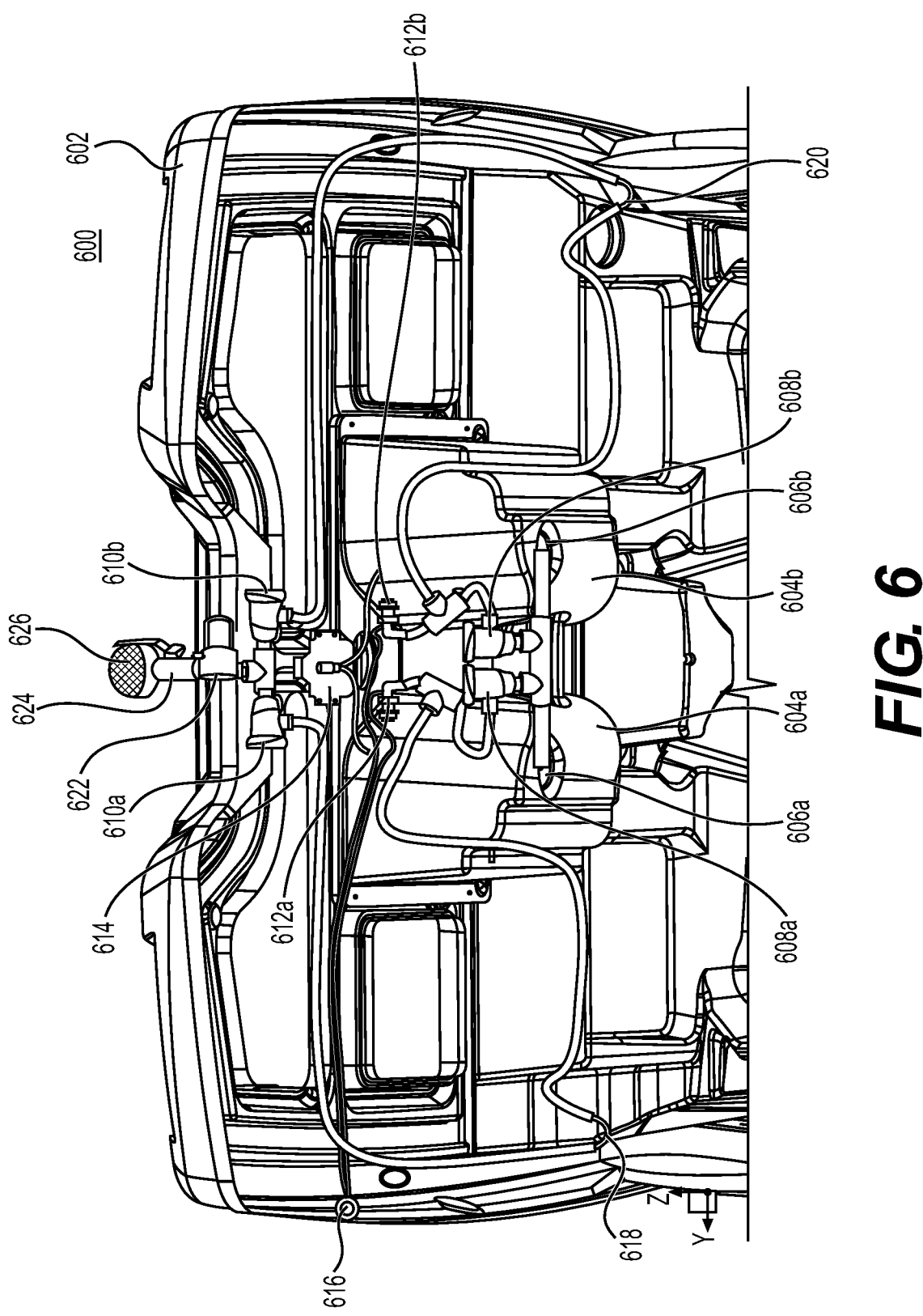
FIG. 6 depicts a schematic diagram of a livewell fill and recirculation system, according to one or more embodiments.

As shown in FIG. 6, livewell fill and recirculation system 600 may be arranged on a vessel body 602 and may incorporate anti-siphon features. System 600 may include chambers 604a and 604b having recirculation outlets 606a and 606b, respectively. Recirculation pumps 608a and 608b may be connected to recirculation outlets 606a and 606b via a manifold and configured to pump water from recirculation outlets 606a and 606b through aerator nozzles 612a and 612b into chambers 604a and 604b, respectively. Aerator nozzles 612a and 612b may each be connected to air intake port 616, as described herein previously, to oxygenate the water that is recirculated.

System 600 may further include intake pumps 610a and 610b. Intake pumps 610a and 610b may be configured to draw in water through hull strainer 626, shut-off valve 624, and water strainer 622. Hull strainer 626 may be configured to remove large particulate matter from the water whereas water strainer 622 may be configured to remove finer particulate matter. Intake pumps 610a and 610b may further be configured to convey water through conduits including anti-siphon vents 618 and 620, respectively, to aerator nozzles 612a and 612b, through which the water may enter chambers 604a and 604b. Anti-siphon vents 618 and 620 may be arranged, for example, above intake pumps 610a and 610b and/or aerator nozzles 612a and 612b, near an underside of the gunwale of vessel body 602. Anti-siphon vents 618 and 620 may inhibit siphons from forming in the conduits such that ingestion of water into chambers 604a and 604b may be stopped and started as desired. Absent anti-siphon vents 618 and 620, it may not be possible to stop water flowing through the conduits until chambers 604a and 604b are full. Anti-siphon vents 618 and 620 may further inhibit recirculation pumps 608a and 608b from conveying water from chamber 604a and 604b past intake pumps 610a and 610b and out of the vessel, without the use of additional valves or positive displacement pumps. In some embodiments, however, valves or positive displacement pumps could be used in combination with or to replace anti-siphon vents 618 and 620.

System 600 may further include an additive reservoir 614. In some embodiments, additive reservoir 614 may be in direct fluid communication with chambers 604a and 604b and may convey additive directly into the chambers.

By including two intake pumps 610a and 610b and two recirculation pumps 608a and 608b, redundancy may be built into system 600. For example, if either of intake pumps 610a or 610b fails, the remaining functioning intake pump may continue to allow filling and operation of system 600. Likewise, if either of the recirculation pumps 608a or 608b fails, the remaining functioning recirculation pump may continue to allow recirculation of water from chambers 604a and 604b. Alternatively, only one of intake pumps 610a and 610b may be run as a primary intake pump whereas the other may be included as a backup. Similarly, only one of recirculation pumps 608a and 608b may be run as a primary recirculation pump whereas the other may be included as a backup.

Figure 7:
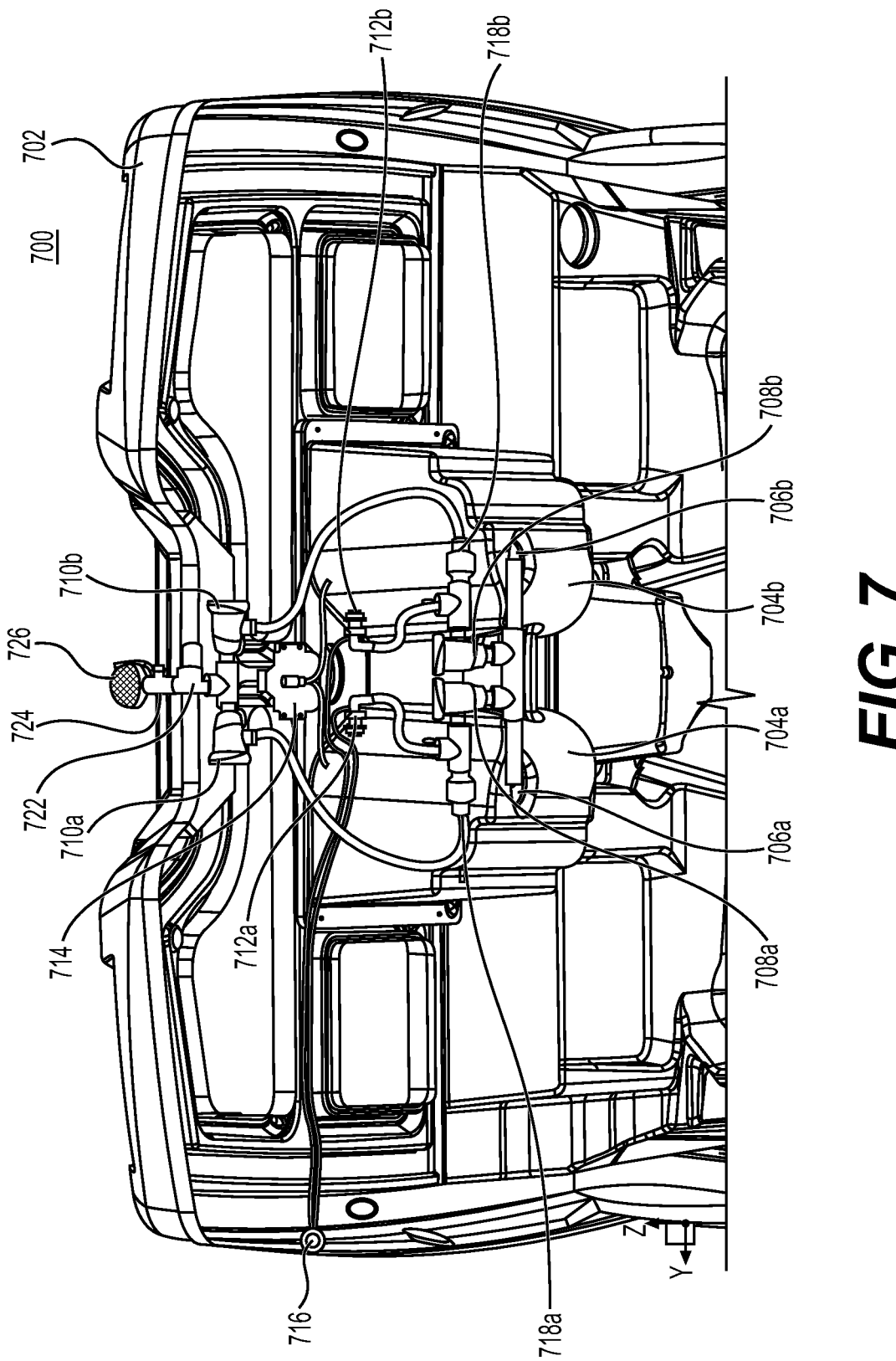
FIG. 7 depicts a schematic diagram of a livewell fill and recirculation system, according to one or more embodiments.

FIG. 7 illustrates another exemplary livewell filling and recirculation system 700 that may include one or more one-way valves, according embodiments of the present disclosure. System 700 may include several of the same components as system 600 described herein previously, and those components will not be described in detail. For example, system 700 may be arranged on a vessel body 702 and may include chambers 704a and 704b having recirculation outlets 706a and 706b with recirculation pumps 708a and 708b connected thereto. Aerator nozzles 712a and 712b connected to air intake port 716 may feed recirculated water back into chambers 704a and 704b. System 700 may further include intake pumps 710a and 710b, hull strainer 726, shut-off valve 724, and water strainer 722. System 700 may further include an additive reservoir 714.

In lieu of the anti-siphon vents of system 600, check valves 718a and 718b (sometimes referred to as one-way valves), may be positioned between intake pumps 710a and 710b and aerator nozzles 712a and 712b. Check valves 718a and 718b may be flapper style valves, swing check valves, ball check valves, spring check valves, or any combination thereof. Intake pumps 710a and 710b may be configured to convey water through check valves 718a and 718b. Check valves 718a and 718b may be configured to inhibit recirculation pumps 708a and 708b from conveying water from chamber 704a and 704b past check valves 718a and 718b toward intake pumps 710a and 710b and out of the vessel.

Figure 8:
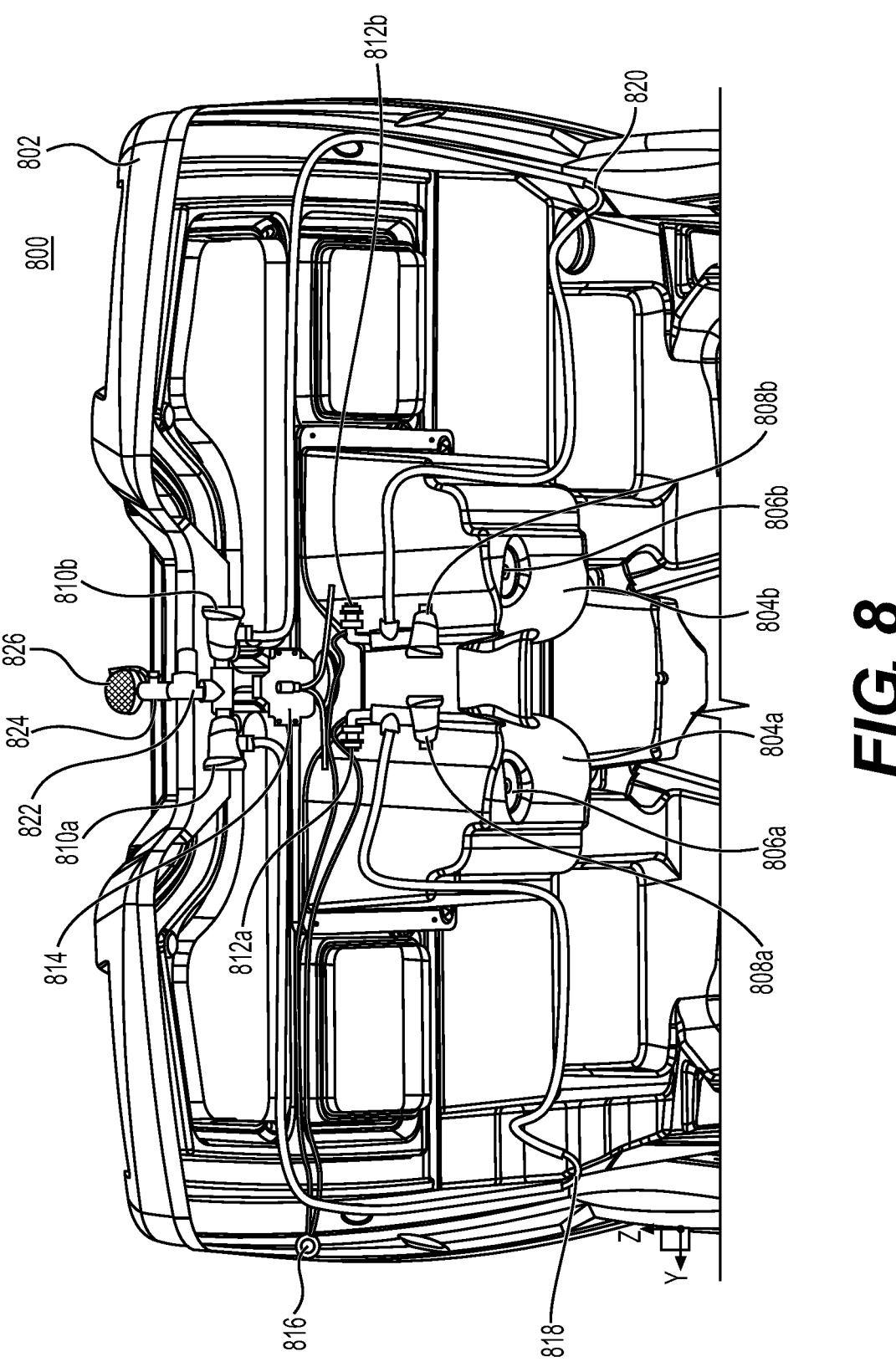
FIG. 8 depicts a schematic diagram of a livewell fill and recirculation system, according to one or more embodiments.

FIG. 8 illustrates another exemplary livewell filling and recirculation system 800 that may include one or more pumps operably coupled to livewell chambers and anti-siphon features, according embodiments of the present disclosure. System 800 may include several of the same components as systems 600 and 700 described herein previously, and those components will not be described in detail. For example, system 800 may be arranged on a vessel body 802 and may include chambers 804a and 804b. Recirculation pumps 808a and 808b may circulate water out of chambers 804a and 804b, and aerator nozzles 812a and 812b connected to air intake port 816 may feed the recirculated water back into chambers 804a and 804b. System 800 may further include intake pumps 810a and 810b, hull strainer 826, shut-off valve 824, and water strainer 822. Intake pumps 810a and 810b may be configured to convey water from outside the vessel, through conduits having anti-siphon vents 818 and 820, and into chambers 804a and 804b. In some aspects, the water may be directed into chambers 804a and 804b in a circular path around the respective chambers to promote more even distribution of oxygen and/or to flow water more evenly across a cooling system that may be in contact with chambers 804a and 804b. System 800 may further include an additive reservoir 814.

Rather than being connected to recirculation ports 806a and 806b located on a bottom of chambers 804a and 804b via a manifold, recirculation pumps 808a and 808b may be positioned on and/or through sidewalls of chambers 804a and 804b. Further, recirculation pump 808a may be in fluid communication with only chamber 804a, whereas recirculation pump 808b may be in fluid communication with only chamber 804b. Such a configuration may eliminate the need for a manifold to connect all of recirculation ports 806a and 806b and recirculation pumps 808a and 808b.

Figure 9:
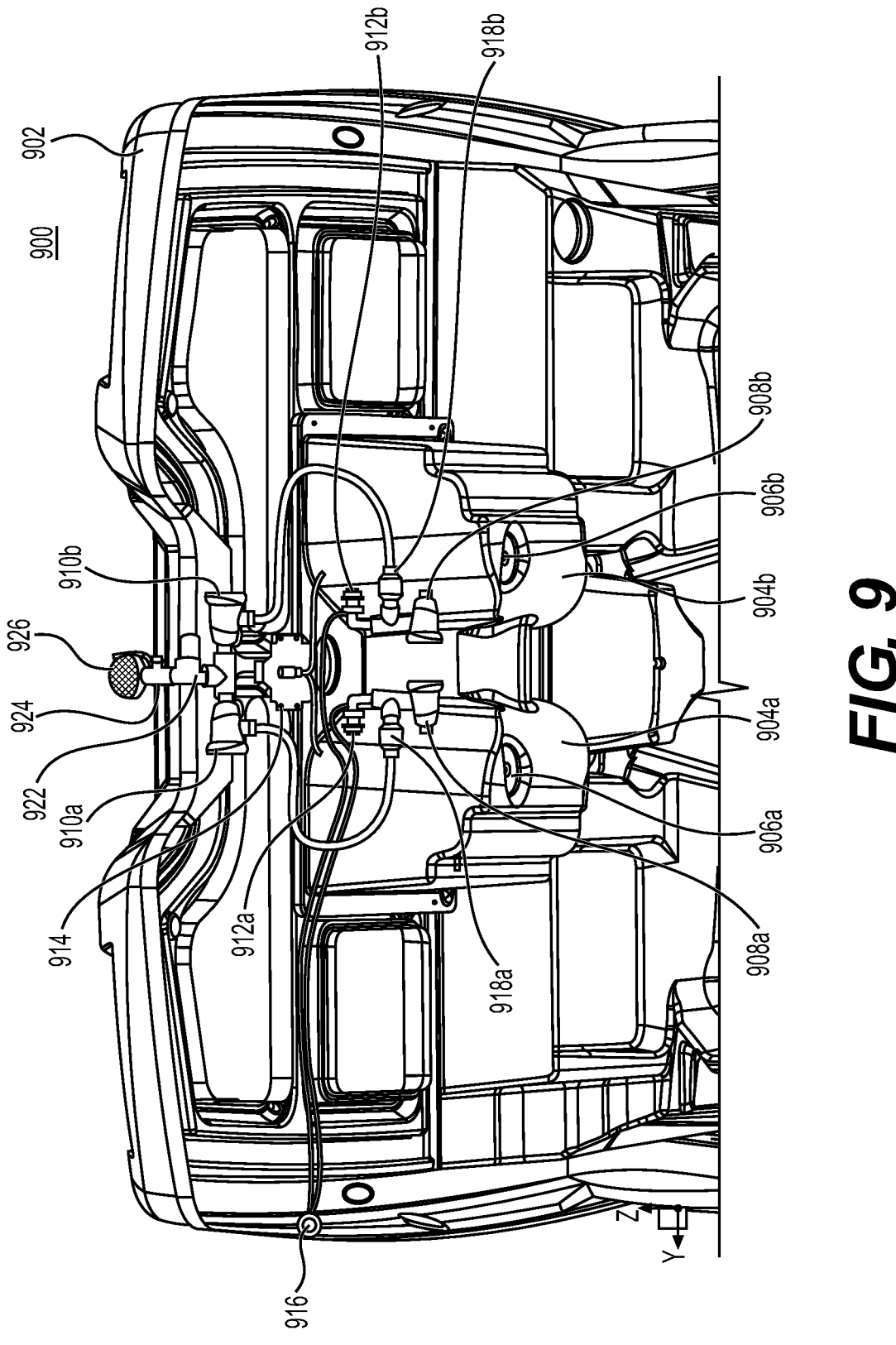
FIG. 9 depicts a schematic diagram of a livewell fill and recirculation system, according to one or more embodiments.

FIG. 9 illustrates another exemplary livewell filling and recirculation system 900 that may include one or more pumps operably coupled to livewell chambers and one or more one-way valves, according embodiments of the present disclosure. System 900 may include several of the same components as systems 600, 700, and 800 described herein previously, and those components will not be described in detail. For example, system 900 may be arranged on a vessel body 902 and may include chambers 904a and 904b. Recirculation pumps 908a and 908b may circulate water out of chambers 904a and 904b and aerator nozzles 912a and 912b connected to air intake port 916 may feed the recirculated water back into chambers 904a and 904b. System 900 may further include intake pumps 910a and 910b, hull strainer 926, shut-off valve 924, and water strainer 922. System 900 may further include an additive reservoir 914.

Similar to system 800, recirculation pumps 908a and 908b may be positioned in sidewalls of chambers 904a and 904b such that recirculation pump 908a may be in fluid communication with only chamber 904a, whereas recirculation pump 908b may be in fluid communication with only chamber 904b.

In contrast with system 800, intake pumps 910a and 910b may be configured to convey water from outside the vessel, through conduits having check valves 918a and 918b, and into chambers 904a and 904b, rather than through conduits having anti-siphon vents. Like system 700, check valves 918a and 918b may be configured to inhibit recirculation pumps 908a and 908b from conveying water from chambers 904a and 904b past check valves 918a and 918b toward intake pumps 910a and 910b and out of the vessel. In some aspects, check valves 918a and 918b may instead be one-way valves.

Figure 10:
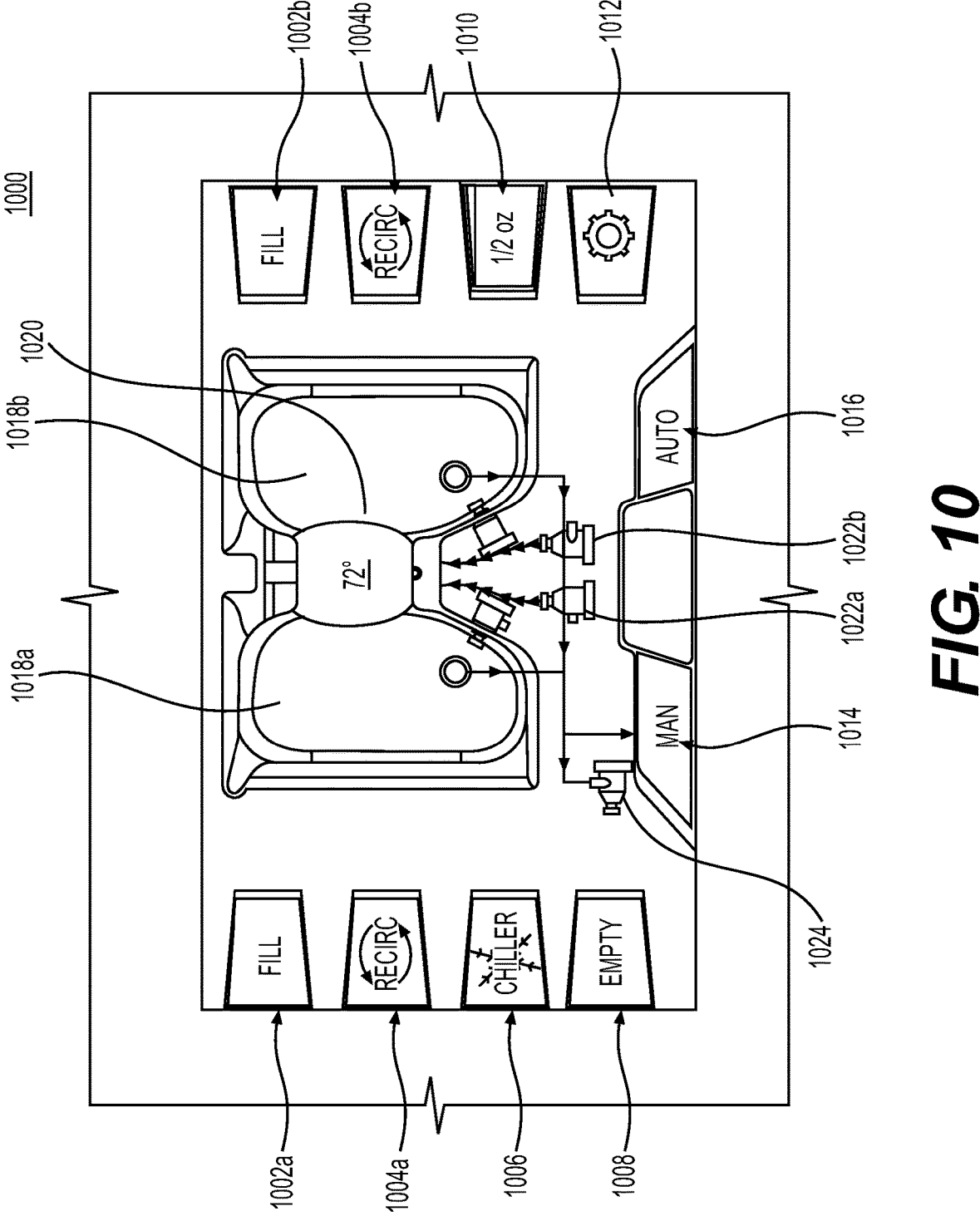
FIG. 10 depicts an exemplary user interface of a livewell system, according to one or more embodiments.

FIG. 10 illustrates an exemplary display screen 1000 of a user interface of a livewell system. In some embodiments, the user interface may include a touch screen such that an operator of a vessel may interact with display screen 1000 by touching icons. In some embodiments, the operator may make selections on the user interface via separate buttons, knobs, dials, or the like.

Display screen 1000 may include graphical representations 1018a and 1018b of port and starboard livewell chambers, respectively. Icon 1002a labeled "FILL" may allow the operator to toggle an intake pump corresponding to the port chamber on and off. Similarly, icon 1002b labeled "FILL" may allow the operator to toggle an intake pump corresponding to the starboard chamber on and off. Icon 1004a labeled "RECIRC" may allow the operator to toggle a recirculation pump corresponding to the port chamber on and off. Similarly, icon 1004b labeled "RECIRC" may allow the operator to toggle recirculation pump corresponding to the starboard chamber on and off. In some aspects, the operator may press "FILL", and the system may automatically fill the livewell to the appropriate fill level with water that is automatically brought to the selected temperature and oxygenation level with the additive automatically dispensed to the selected concentration. In embodiments in which valves are included, control of the valves may be accomplished automatically by the system.

Icon 1006 labeled "CHILLER" may allow the operator to toggle either a compressor or a condenser on or off to cool water in the chambers. Icon 1008 labeled "EMPTY" may allow the operator to toggle one or more drain pumps on or off to empty the chambers. One or more drain valves may be automatically controlled to shut off once draining is complete, which may be determined via the use of one or more of, e.g., a float switch, a current sensor, or a timer. In some embodiments, icon 1008 may allow the operator to open or close a gravity drain valve to empty the chambers. Icon 1010 labeled "½ oz" may allow the operator to adjust an amount of additive added to the water in the chambers. Icon 1012 may open a setting menu when selected.

Icon 1014 labeled "MAN" may allow the operator to select a manual mode in which the operator may control the aforementioned fill, recirculation, cooling, and additive-related functions. In manual mode, the operator may be able to fill or drain the chambers to any level he or she prefers on command. Icon 1016 labeled "AUTO," on the other hand, may allow the operator to select an automatic mode in which the control unit operates the livewell system according to predefined settings. In some embodiments, in automatic mode, the operator may still be able to manually override or adjust some of the settings via the control unit and/or manual switches or valves, etc.

Display screen 1000 may also display a temperature 1020 of the water in the chambers, and/or a percent oxygenation of water within the chambers (not shown). Display screen 1000 may also optionally include graphical representations 1022a and 1022b of intake pumps and a graphical representation of drain pump 1024 to indicate to the operator which pumps are operating at any given moment.

The various icons and graphics shown on display screen 1000 are only intended to be exemplary, and it should be understood that the icons and graphics could be rearranged, labeled differently, removed, or additional icons may be included. For example, the icons and graphics need not be arranged as shown in FIG. 10. Moreover, icon 1006 may be labeled "COOL" instead of "CHILLER," for example. As another example, icon 1010 may be labeled with any appropriate unit of measurement in lieu of "½ oz." As still another example, the icons may be labeled in languages other than English.

FIGS. 11-15 illustrate exemplary methods of operating a livewell system, according to embodiments of the disclosure. The user interface and control unit of the system may allow for customization of various aspects of the livewell system, such as fill level, amount of additive added to the water, oxygenation, and water temperature. In some embodiments, the operator may select specific values for some of these metrics or each of these metrics, and the system may operate to achieve the specified values. Alternatively, the system may allow the operator to initiate automatic control, and the system may operate according to one or more default values. For example, upon initiation of automatic control, the system may automatically fill the livewell tank with a predetermined default additive ratio, cool the water to a predetermined default temperature using recirculation, and oxygenate the water to a predetermined default oxygenation level using recirculation. In some aspects, the system may allow a user to use all default metrics, to use all selected metrics, or to use some default and some selected metrics, and they system may operate to automatically achieve these values.

Figure 11:
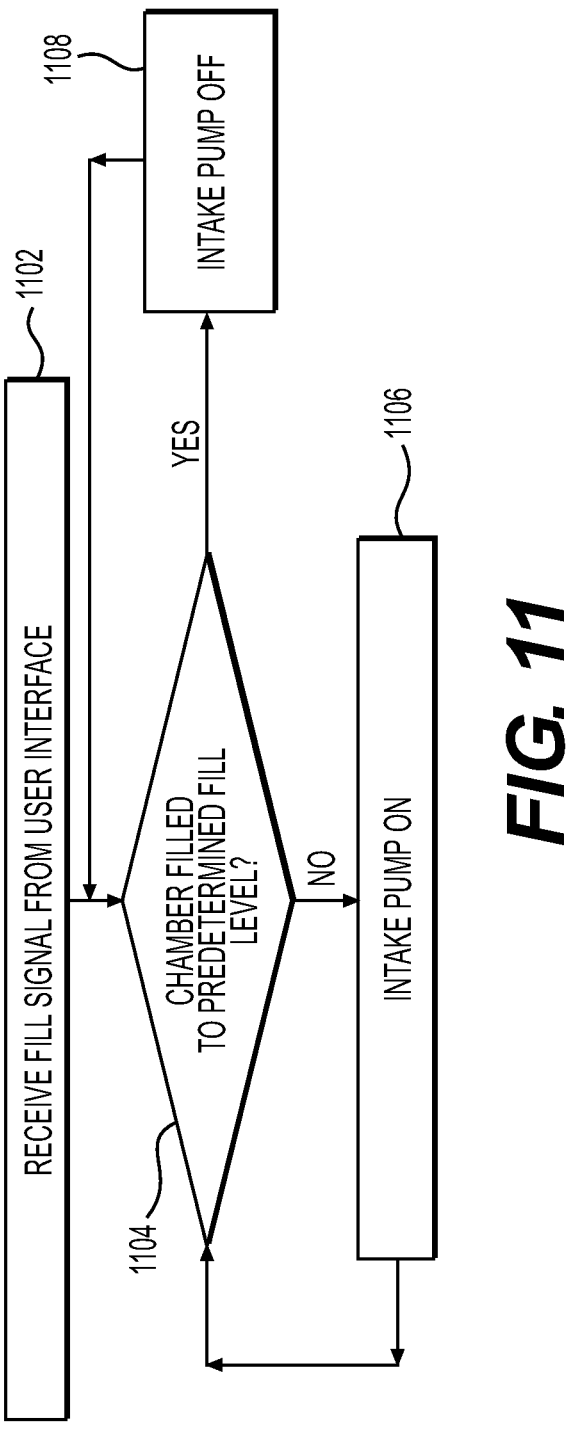
FIG. 11 depicts an exemplary method of filling a livewell, according to one or more embodiments.

FIG. 11 specifically illustrates an exemplary method 1100 of filling a livewell tank, or in other words a fill logic for filling a livewell tank. At step 1102, the control unit may receive a fill signal from the user interface. The fill signal may be transmitted from the user interface in response to a selection made by an operator of the vessel. The operator may make such a selection when he or she desires to fill a chamber of the livewell tank. Alternatively, the fill signal may be generated automatically in response to a trigger event, such as placing the vessel in the water, for example.

At step 1104, the control unit may determine whether the chamber of the livewell tank is filled to a predetermined fill level. For example, if the chamber is not filled to the predetermined fill level, the control unit may receive either no signal or a signal indicative that the chamber is not filled to the predetermined fill level from the fill sensor. If, on the other hand, the chamber is filled to the predetermined fill level, the control unit may receive a signal indicative that the chamber is filled to the predetermined fill level from the fill sensor. The control unit may make its determination based on the signal received or not received.

Taking for example livewell system 100 described herein previously with reference to FIG. 1, control unit 130 may determine whether livewell tank 144 is filled to the predetermined fill level. Control unit 130 may make the determination based upon a signal received (or not received) from fill sensor 154 positioned in the drain conduit. Control unit 130 may determine that livewell tank 144 is not full when the water level in livewell tank 144 does not rise into the drain conduit to the height of fill sensor 154. Control unit 130 may determine that the livewell tank 144 is full when the water level in livewell tank 144 rises into the drain conduit to or above the height of fill sensor 154. In response to a determination that the chamber is not filled to the predetermined fill level, such as when the chamber is empty, for example, the method may proceed to step 1106. At step 1106, the control unit may cause the intake pump to turn on and convey water into the chamber. For example, control unit 130 may cause intake pump 150 to turn on, conveying water through water pick-up 106 and the intake conduit and into livewell tank 144. The method may then revert back to step 1104, and the intake pump may remain on until the control unit determines that the chamber is filled to the predetermined fill level.

In some embodiments, the control unit may limit an amount of time the intake pump is permitted to run continuously. For example, the control unit may automatically switch the intake pump off after a fixed period of time, such as after about 30 seconds, about 1 minute, about 5 minutes, or any other amount of time. While limiting the intake pump in such a manner, the control unit may continue to make the determination of step 1104 and proceed to steps 1106 or 1108 accordingly. By limiting the amount of time the intake pump is permitted to run continuously as described, the system may make it easier for the operator to determine whether either of the intake pump or the fill sensor has malfunctioned. In some embodiments, the control unit may cause a notification of a malfunction to be displayed on the user interface.

In response to a determination that the chamber is filled to the predetermined fill level, the method may proceed to step 1108. At step 1108, the control unit may cause the intake pump to turn off and cease conveying water into the chamber. In some embodiments, the control unit may delay causing the intake pump to turn off for a delay period after determining that the chamber is filled to the predetermined fill level. The delay period may be, for example, 1 to 5 seconds, 5 to 10 seconds, 1 to 10 seconds, 1 to 30 seconds, or any other suitable period of time. By implementing the delay, a column of water may be permitted to form in the conduit in which the fill sensor is positioned due to the continued operation of the intake pump. The column of water may inhibit the chamber water level from settling near a level of the fill sensor and thereby inhibit oscillating signals from the fill sensor.

For example, control unit 130 may cause intake pump 150 to turn off and cease conveying water through water pick-up 106 and the intake conduit. In embodiments in which control unit 130 causes intake pump 150 to turn off after a delay, the delay may allow livewell tank 144 to fill completely such that a column of water is formed in the drain conduit leading to drain 156. The column of water may extend above fill sensor 154 such that fill sensor 154 continues to detect that livewell tank 144 is filled even when vessel 102 pitches and rolls due to waves.

From step 1108, the method may then revert back to step 1104, and the intake pump may remain off until the control unit determines that the chamber is not filled to the predetermined fill level. By such a configuration, the control unit may continue to monitor the fill level of the chamber after it has initially been filled. The monitoring may be continuous or may be intermittent. For example, step 1104 may be performed at predetermined time intervals. In some embodiments, monitoring may be continuous while the intake pump is on and revert to intermittent when the intake pump is off, or vice versa.

In some embodiments, the control unit may filter the signal received from the fill sensor to mitigate the effect of signal noise. For example, the control unit may determine that the chamber is either filled or not filled to the predetermined fill level only if it receives a corresponding signal from the fill sensor for a minimum period of time. Accordingly, the control unit may inhibit momentary changes in the signal from the fill sensor from changing a state of the intake pump.

In some embodiments, when the livewell tank is empty at the time the fill signal is received, the control unit may be configured to turn the intake pump on for a fixed amount of time. For example, if the livewell tank is capable of holding 30 gallons of water, and the intake pump is capable of pumping water at a rate of three gallons per minute, the control unit may be configured to turn the intake pump on for 10 minutes, or slightly longer than 10 minutes. In the given example, running the intake pump for 10 minutes would cause 30 gallons of water to be pumped into the livewell tank such that the livewell tank may be filled. Running the intake pump for slightly longer than 10 minutes would cause a column of water to form in the conduit in which the fill sensor is positioned.

Method 1100 may therefore allow the livewell chamber to be filled in response to a single selection by the operator of the vessel. The livewell system need not continuously run the intake pump to maintain the fill level of the livewell chamber, but instead may monitor the fill level and run the intake pump as necessary. By monitoring the fill level, the system may ensure that the chamber is filled when the fill level decreases for any reason, such as water splashing out, a fish being removed, or because of a leak. Accordingly, the livewell chamber can remain filled, thereby inhibiting sloshing and potential bodily harm to any fish stored in the chamber By inhibiting bodily harm to the fish, the system may help ensure that the fish are released without an increased risk of mortality. Moreover, intake of warm water from outside the vessel into the chilled livewell chamber may be reduced, thereby reducing cooling demands of the system and improving efficiency.

Further, method 1100 may allow an operator of the livewell system and/or the vessel to easily exchange water from the chamber with new water. For example, to exchange the water in the chamber, the operator may simply switch on the drain pump while the system is monitoring the fill level. The drain pump may reduce the fill level in the chamber, which may be detected by the fill sensor, and consequently the intake pump may be caused to turn on as a result of method 1100. Accordingly, water from the chamber may be drained out and replaced with fresh water simply by activating the drain pump. Such exchange of water may further allow the operator to gradually increase the temperature of water in the chamber. Increasing the temperature gradually may be advantageous for preparing any fish in the chamber to be reintroduced into the body of water from which they were temporarily removed, reducing shock to the fish from a quick temperature change. A release mode may automatically control the gradual increase of temperature in the livewell, for example, by slowly adding water from the surrounding environment into the livewell over a period of time.

Figure 12:
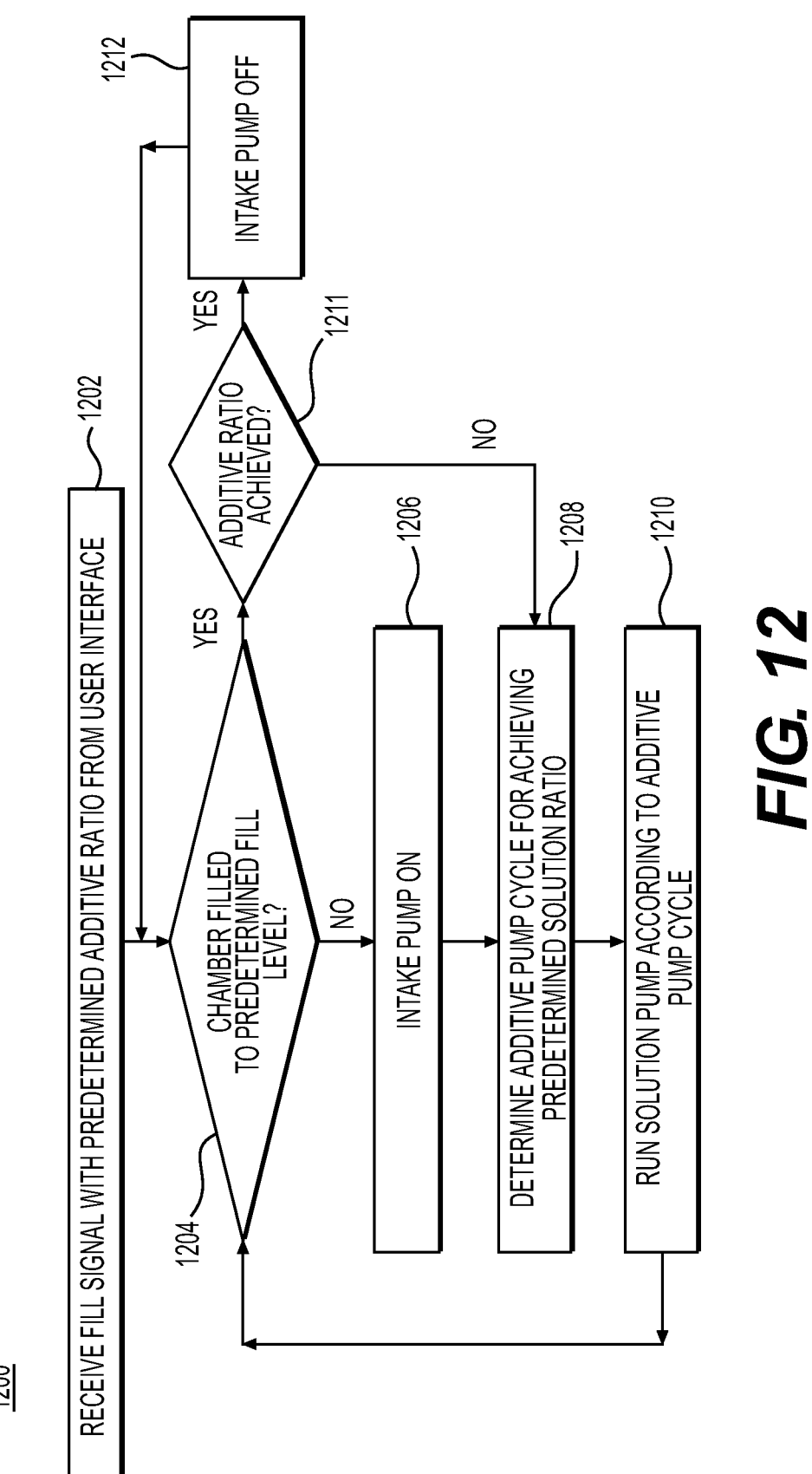
FIG. 12 depicts an exemplary method of achieving an additive ratio in a livewell according to one or more embodiments.

FIG. 12 illustrates an exemplary method 1200 of filling a livewell tank with a predetermined ratio of additive to water. At step 1202, the control unit may receive a fill signal from the user interface. The fill signal may include a predetermined ratio of additive to water, or additive ratio, with which to fill the livewell chamber, or the additive may be added to the water in response to a signal received from a salinity sensor. For example, referring to livewell system 200, control unit 230 may receive the fill signal from user interface 232. The fill signal may be indicative of a request by the operator to fill livewell tank 244.

In some embodiments, the predetermined additive ratio may be an additive ratio that is selected by the operator and that may be selected via the user interface. In this manner, the operator may customize the ratio of additive to water with which the livewell chamber is filled. The predetermined additive ratio may also be a default value. For example, if the operator does not select an additive ratio via the user interface, the control unit may use the default value. Use of the default value may allow the livewell chamber to be filled with a standard ratio of additive to water even when the operator does not select an additive ratio, thereby minimizing the amount of interaction required of the operator.

The additive ratio may be any suitable figure, such as ounces of additive per fill (e.g., ½ oz per every 30 gallons of water, 1 oz per every 30 gallons of water, ¼ oz per every 30 gallons of water, or any other amount), parts water to parts additive (e.g., 100:1), etc. The fill signal may be transmitted from the user interface in response to a selection made by an operator of the vessel. The operator may make such a selection when he or she desires to fill a chamber of the livewell tank with a particular additive ratio. The fill signal may alternatively be generated in response to a determination that the fill level has dropped below a predetermined fill level, as described herein previously with reference to method 1100. Accordingly, even when refilling the livewell chamber after an initial fill, the system may ensure that the predetermined additive ratio is maintained. In some embodiments, the system may cause additive to be added after a predetermined number of refill cycles, thereby reducing the frequency with which the additive reservoir and/or associated pump are operated.

At step 1204, the control unit may determine whether the chamber of the livewell tank is filled to a predetermined fill level. For example, if the chamber is not filled to the predetermined fill level, the control unit may receive either no signal or a signal indicative that the chamber is not filled to the predetermined fill level from the fill sensor.

If, on the other hand, the chamber is filled to the predetermined fill level, the control unit may receive a signal indicative that the chamber is filled to the predetermined fill level from the fill sensor. The control unit may make its determination based on the signal received or not received.

For example, referring again to livewell system 200, control unit 230 may determine whether livewell tank 244 is filled to the predetermined fill level. Control unit 230 may make the determination based upon a signal received (or not received) from fill sensor 224 positioned in the drain conduit. Control unit 230 may determine that livewell tank 244 is not full when the water level in livewell tank 244 does not rise into the drain conduit to the height of fill sensor 224. Control unit 230 may determine that the livewell tank 244 is full when the water level in livewell tank 244 rises into the drain conduit to or above the height of fill sensor 224.

In response to a determination that the chamber is not filled to the predetermined fill level, such as when the chamber is empty, for example, the method may proceed to step 1206. At step 1206, the control unit may cause the intake pump to turn on and convey water into the chamber. For example, control unit 230 may cause intake pump 212 to turn on, conveying water through water pick-up 206 and the intake conduit and into livewell tank 144. The method may then proceed to step 1208.

At step 1208, the control unit may determine an additive pump cycle for achieving the predetermined additive ratio. For example, the intake pump may convey water at a first constant rate and the additive pump may convey additive at a second constant rate. Based on the predetermined additive ratio, the first constant rate, and the second constant rate, the control unit may determine that the additive pump must be run for a certain number of seconds for every minute the intake pump is run to achieve the predetermined additive ratio. The control unit may then determine the additive pump cycle accordingly. The additive pump cycle need not be based on any particular time interval and indeed may be any cycle resulting in the predetermined additive ratio.

At step 1210, the control unit may cause the additive pump to convey additive into the chamber according to the additive pump cycle. As a result, a mixture of water and additive may be formed in the chamber. For example, control unit 230 may cause the pump of additive reservoir 214 to convey additive into livewell tank 244 according to the additive pump cycle. The method may then revert back to step 1204 and the intake pump may remain on and the additive pump may continue to operate according to the additive pump cycle until the control unit determines that the chamber is filled to the predetermined fill level. For example, control unit 230 may cause the pump of additive reservoir 214 to continue to operate according to the additive pump cycle while causing intake pump 212 to continue to convey water into livewell tank 244.

In response to a determination that the chamber is filled to the predetermined fill level, the method may proceed to step 1211. At step 1211, the control unit may determine whether the predetermined additive ratio has been achieved. The control unit may make such a determination based on one or more signals from a salinity sensor 338, for example. If the control unit determines that the predetermined additive ratio has not been achieved, the method may revert to step 1208. If the control unit determines that the predetermined additive ratio has been achieved, the method may proceed to step 1212. Accordingly, in some aspects, additive ratio may be separated from fill level control, if desired. For example, the livewell may be full, but a user may want to increase the additive ratio.

At step 1212, the control unit may cause the intake pump to turn off and cease conveying water into the chamber. The control unit may likewise cause the additive pump to cease cycling and turn off. For example, control unit 230 may cause intake pump 212 to turn off and cease conveying water through water pick-up 206 and the intake conduit. Control unit 230 may likewise cause the pump of pump of additive reservoir 214 to cease cycling and turn off. The method may then revert back to step 1204 and the intake pump and additive pump may remain off until the control unit determines that the chamber is not filled to the predetermined fill level. By such a configuration, the control unit may continue to monitor the fill level of the chamber after it has initially been filled.

In some embodiments, additive may be added to the livewell chamber independently of water added to the livewell chamber. For example, when the livewell chamber is already filled with water, the additive pump may be run independently of the intake pump. In some embodiments, the additive pump may be run for a fixed amount of time sufficient to add a desired amount of additive to the already-filled livewell chamber.

Method 1200 may therefore allow the livewell chamber to be filled with a predetermined additive ratio in response to a selection by the operator of the vessel. The livewell system need not continuously run the intake pump and/or additive pump to maintain the fill level of the livewell chamber with the predetermined additive ratio, but instead may monitor the fill level and run the pumps as necessary.

Figure 13:
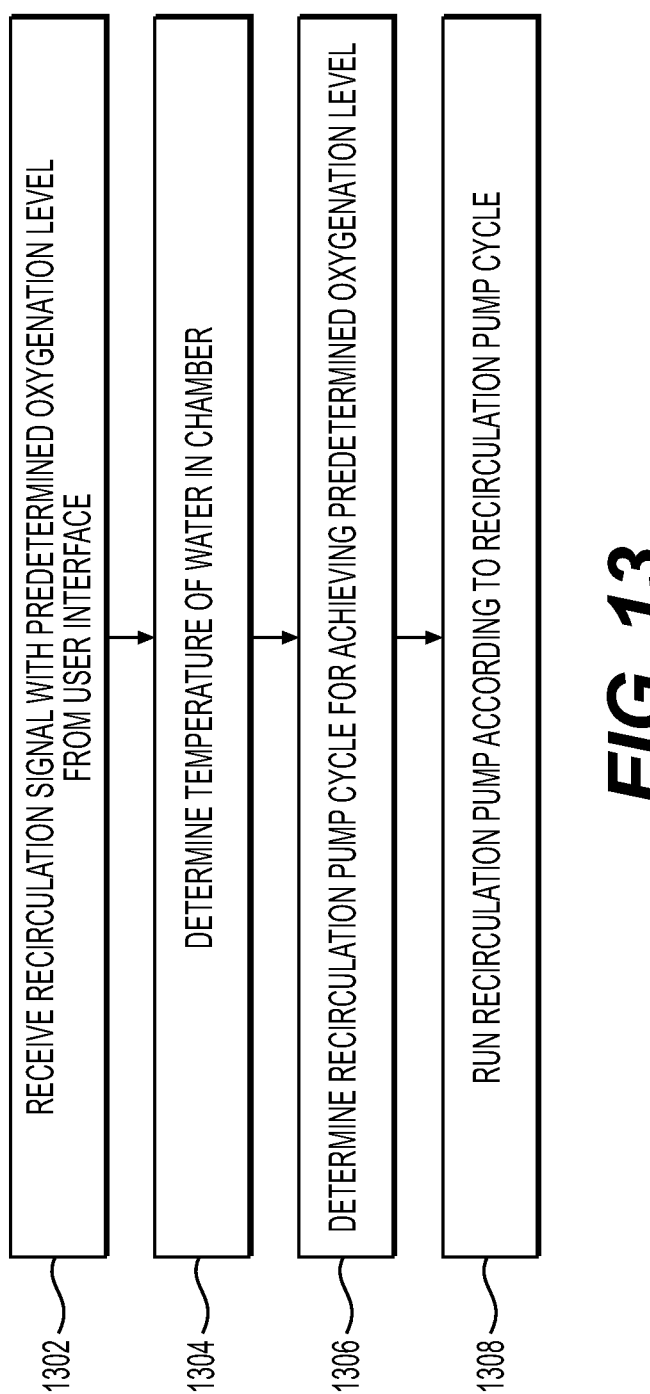
FIG. 13 depicts an exemplary method of oxygenating a livewell, according to one or more embodiments.

FIG. 13 illustrates an exemplary method 1300 of recirculating water in a livewell system and controlling an oxygenation level that may utilize an oxygenation table.

At step 1302, the control unit may receive a recirculation signal from the user interface. The recirculation signal may include a predetermined oxygenation level for the water in the chamber. For example, referring to livewell system 100, control unit 130 may receive the recirculation signal from user interface 132. The recirculation signal may be indicative of a request by the operator to recirculate water in the livewell tank 144. In some embodiments, recirculation may be initiated automatically upon a trigger event such as a determination by control unit 130 that the fill level of livewell tank 144 is at least a predetermined fill level. Alternatively, recirculation may be automatically initiated periodically after a predetermined time interval.

The oxygenation level may be any suitable figure, such as concentration of dissolved oxygen or the like. In some embodiments, the predetermined oxygenation level may be an oxygenation level that is selected by the operator and that may be selected via the user interface. In this manner, the operator may customize the oxygenation level of the water in the livewell chamber. The predetermined oxygenation level may also be a default value. For example, if the operator does not select an oxygenation level via the user interface, the control unit may use the default value. Use of the default value may allow the livewell system to maintain a standard oxygenation level even when the operator does not select an oxygenation level, thereby minimizing the amount of interaction required of the operator.

At step 1304, the control unit may determine a temperature of the water in the chamber. The control unit may receive a signal from a temperature sensor positioned in the chamber. From the signal, the control unit may determine the temperature of the water. For example, control unit 130 may receive a signal from livewell temperature sensor 138 indicative of a temperature of the water in livewell tank 144.

At step 1306, the control unit may determine a recirculation pump cycle for achieving the predetermined oxygenation level. In other words, the control unit may determine how often and for how long the recirculation pump must be run to circulate water through the aerator nozzle for oxygenation. For example, referring to livewell system 100, control unit 130 may determine how often and for how long recirculation pump 124 must be run to circulate water from livewell tank 144 through aerator nozzle 128 to achieve the predetermined oxygenation level.

In some embodiments, the control unit may determine the recirculation pump cycle using a lookup table. The lookup table may leverage known relationships between volume, temperature, and the amount of oxygen that can be dissolved into additive. For example, the lookup table may relate temperature of the water with an amount of oxygen added per unit time to maintain predetermined oxygenation levels. Based on the predetermined oxygenation level and temperature of the water, and using the lookup table, the control unit may determine that the recirculation pump must be run with a certain frequency and for a certain duration to maintain the predetermined oxygenation level based on the water temperature. In some embodiments, the frequency and duration may be such that the recirculation pump is run for five minutes every half hour, for 15 minutes every one hour, for 30 minutes every two hours, or any other suitable frequency and duration.

In some embodiments, the recirculation pump cycle determined by the control unit may introduce more oxygen into the livewell chamber than would be required to achieve the predetermined oxygenation level. For example, the recirculation pump cycle may be determined such that a buffer amount of oxygen is added to the water in the livewell chamber beyond the amount that would achieve the predetermined oxygenation level. For example, the recirculation pump cycle may run the recirculation pump more than necessary, which in some embodiments may be about 5% more than necessary, 10% more than necessary, 15% more than necessary, 20% more than necessary, or any other suitable amount of overshoot for running the recirculation pump. As excess oxygenation in the water of the livewell chamber is unlikely to harm the fish or otherwise cause issues, over-oxygenating the water may not be undesirable.

At step 1308, the control unit may cause the recirculation pump to run according to the recirculation pump cycle. For example, control unit 130 may cause recirculation pump 124 to run according to the recirculation pump cycle to recirculate water from livewell tank 144 into the recirculation conduit, through aerator nozzle 128, and back into livewell tank 144.

Though method 1300 is described herein with reference to an aerator nozzle for oxygenation, an oxygen generator and a bubbler stone may be used in addition, or as an alternative, to the aerator nozzle. For example, in addition to cycling recirculation pump 124, control unit 130 may also cause oxygen generator 140 to turn on, thereby conveying oxygen through bubbler stone 142 and into the water in livewell tank 144. In some embodiments, oxygen generator 140 and bubbler stone 142 may be the sole source of oxygen for water in livewell tank 144.

Method 1300 may therefore allow the livewell system to achieve a desired oxygenation level in the chamber without constantly running the recirculation pump or a separate oxygenation generator. Thereby, the efficiency of the system may be optimized while still allowing a sufficient and desirable oxygenation level to keep fish in the livewell healthy. For example, battery may be saved by not running the recirculation pump, oxygen generator, or chiller more than required to maintain proper oxygenation. This increased efficiency may help ensure that the energy stored in the boat's battery system is sufficient to power all electrical systems for a sufficient duration ideally without needing additional charge power while fishing.

Figure 14:
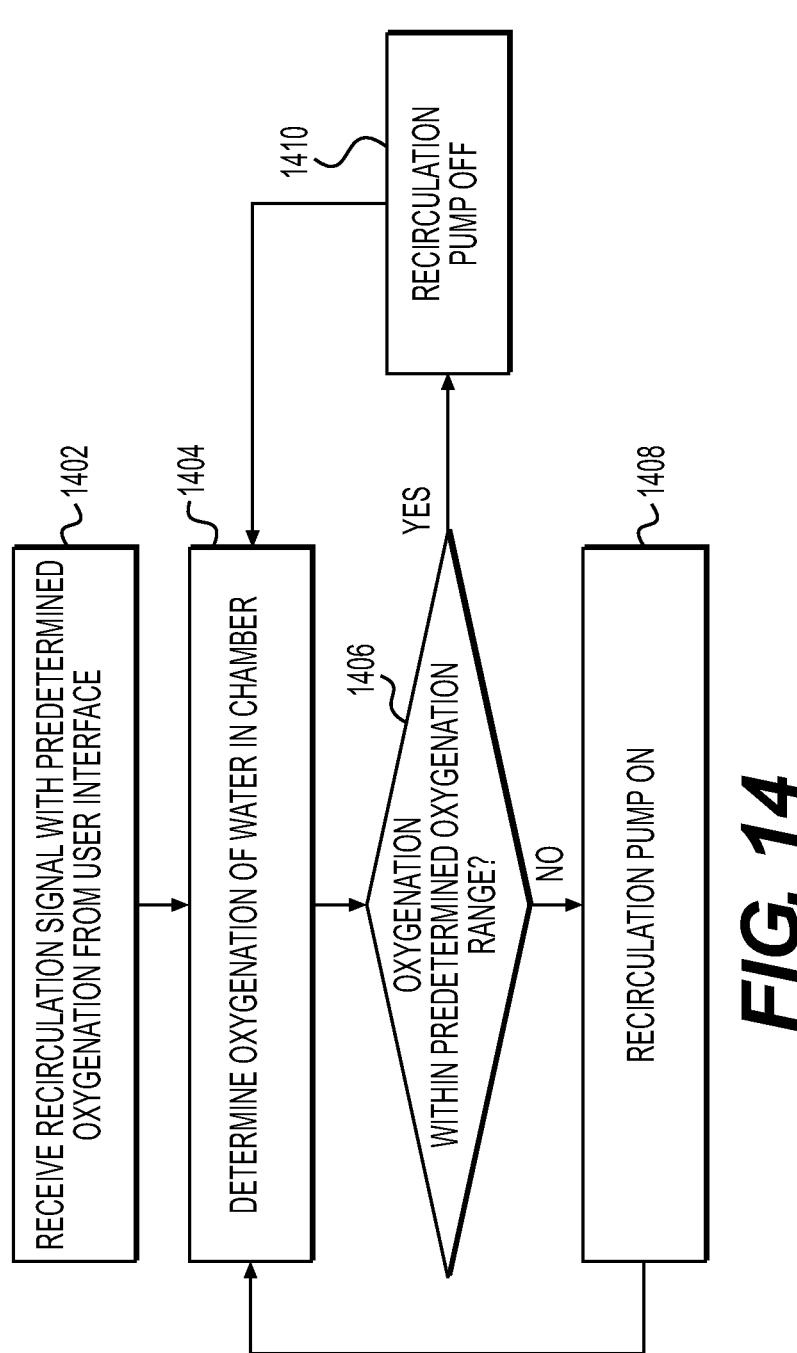
FIG. 14 depicts an exemplary method of oxygenating a livewell, according to one or more embodiments.

FIG. 14 illustrates another exemplary method 1400 of recirculating water in a livewell system and controlling an oxygenation level that may utilize an oxygenation sensor. At step 1402, the control unit may receive a recirculation signal from the user interface. The recirculation signal may include a predetermined oxygenation level for the water in the chamber. For example, referring to livewell system 300, control unit 330 may receive the recirculation signal from user interface 332. The recirculation signal may be indicative of a request by the operator to recirculate water in the livewell tank 344. In some embodiments, recirculation may be initiated automatically upon a trigger event such as a determination by control unit 330 that the fill level of livewell tank 344 is at least a predetermined fill level. Alternatively, recirculation may be automatically initiated periodically after a predetermined time interval.

As described above, the oxygenation level may be any suitable figure, such as concentration of dissolved oxygen or the like. In some embodiments, the predetermined oxygenation level may be an oxygenation level that is selected by the operator and that may be selected via the user interface. The predetermined oxygenation level may also be a default value.

At step 1404, the control unit may determine an oxygenation level of the water in the chamber. The control unit may receive a signal from an oxygen sensor positioned in the chamber. From the signal, the control unit may determine the oxygenation of the water. For example, control unit 330 may receive a signal from oxygen sensor 340 indicative of an oxygenation level of the water in livewell tank 344.

At step 1406, the control unit may determine whether the oxygenation level is within a predetermined oxygenation range. The predetermined oxygenation range may be a range of oxygenation values determined based on the predetermined oxygenation level. For example, the predetermined oxygenation range may incorporate a standard deviation above and below the predetermined oxygenation level. In another example, the predetermined oxygenation level may be a minimum value within the predetermined oxygenation range. By utilizing a range of values, the system need not be triggered by slight changes in the measured oxygenation level within the livewell chamber. In some embodiments, however, the predetermined oxygenation range may be exactly the predetermined oxygen level.

In response to a determination that the measured oxygenation level in the chamber is not within the predetermined oxygenation range, the method may proceed to step 1408. At step 1408, the control unit may cause the recirculation pump to turn on and convey water into the chamber. For example, control unit 330 may cause recirculation pump 318 to turn on, conveying water from livewell tank 344, through the recirculation conduit and aerator nozzle 334, and back into livewell tank 344. The method may then revert back to step 1404, and the recirculation pump may remain on until the control unit determines that the measured oxygenation level in the chamber is within the predetermined oxygenation range.

In response to a determination at step 1406 that the measured oxygenation level in the chamber is within the predetermined oxygenation range, the method may proceed to step 1410. At step 1410, the control unit may cause the recirculation pump to turn off and cease recirculating water. For example, control unit 330 may cause recirculation pump 318 to turn off and cease conveying water through the recirculation conduit.

From step 1410, the method may then revert back to step 1404, and the recirculation pump may remain off until the control unit determines that the measured oxygenation level in the chamber is not within the predetermined oxygenation range. By such a configuration, the control unit may continue to monitor the oxygenation level of the chamber after it has initially been oxygenated. The monitoring may be continuous or may be intermittent. For example, step 1404 may be performed at predetermined time intervals. In some embodiments, monitoring may be continuous while the recirculation pump is on and revert to intermittent when the recirculation pump is off, or vice versa.

Method 1400 may therefore allow the livewell system to achieve a desired oxygenation level, using an oxygen sensor positioned in the chamber, without constantly running the recirculation pump or a separate oxygenation generator. In contrast with method 1300, the use of an oxygen sensor with method 1400 may obviate the need for a lookup table and related logic. The efficiency of the system may therefore be optimized while still allowing a sufficient and desirable oxygenation level to keep fish in the livewell healthy.

Figure 15:
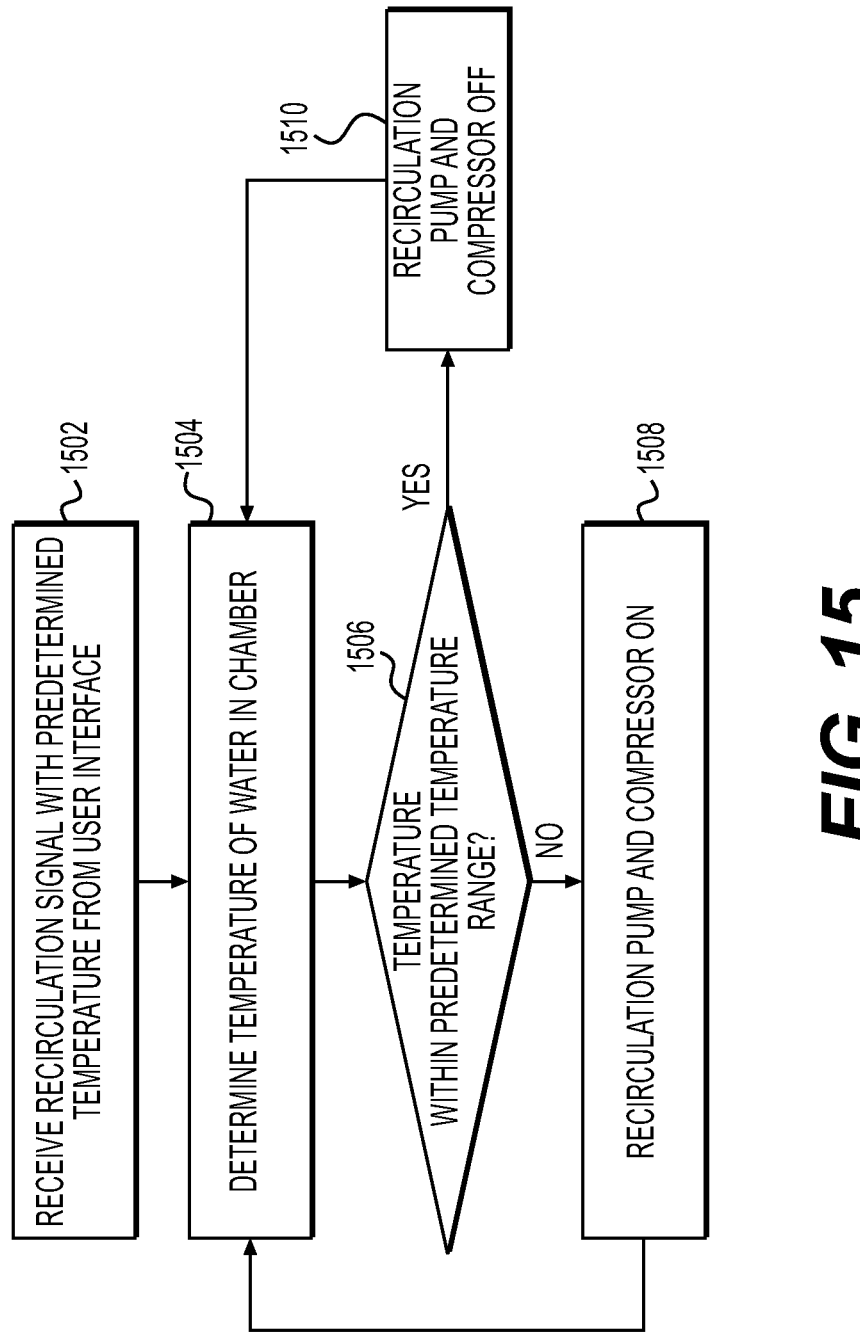
FIG. 15 depicts an exemplary method of controlling a temperature of a livewell, according to one or more embodiments.

FIG. 15 illustrates an exemplary method 1500 of recirculating water in a livewell system and controlling a temperature of the water. At step 1502, the control unit may receive a recirculation signal from the user interface. The recirculation signal may include a predetermined temperature for the water in the chamber. For example, referring to livewell system 100, control unit 130 may receive the recirculation signal from user interface 132. The recirculation signal may be indicative of a request by the operator to recirculate water in the livewell tank 144. In some embodiments, recirculation may be initiated automatically upon a trigger event such as a determination by control unit 130 that the fill level of livewell tank 144 is at least a predetermined fill level. Alternatively, recirculation may be automatically initiated periodically after a predetermined time interval.

In some embodiments, the predetermined temperature may be a temperature that is selected by the operator and that may be selected via the user interface. The predetermined temperature may also be a default value. For example, if the operator does not select a temperature via the user interface, the control unit may use the default value. Use of the default value may allow a temperature of the water within the livewell chamber to be maintained at a standard temperature even when the operator does not select a temperature, thereby minimizing the amount of interaction required of the operator.

At step 1504, the control unit may determine a temperature of the water in the chamber. The control unit may receive a signal from a temperature sensor positioned in the chamber. From the signal, the control unit may determine the temperature of the water. For example, control unit 130 may receive a signal from livewell temperature sensor 138 indicative of a temperature of the water in livewell tank 144.

At step 1506, the control unit may determine whether the temperature is within a predetermined temperature range. The predetermined temperature range may be a range of temperatures determined based on the predetermined temperature. For example, the predetermined temperature range may incorporate a standard deviation above and below the predetermined temperature. In another example, the predetermined temperature may be a minimum value within the predetermined temperature range. By utilizing a range of values, the system need not be triggered by slight changes in the measured temperature of the water within the livewell chamber. In some embodiments, however, the predetermined temperature range may be exactly the predetermined temperature.

In response to a determination that the measured temperature in the chamber is not within the predetermined temperature range, the method may proceed to step 1508. At step 1508, the control unit may cause the recirculation pump to turn on and convey water into the chamber. The control unit may further cause the compressor to turn on. For example, control unit 130 may cause recirculation pump 124 to turn on, conveying water from livewell tank 144 through the recirculation conduit and heat exchanger 120, and back into livewell tank 344. Control unit 130 may further cause compressor 118 to turn on, thereby circulating cooled refrigerant into heat exchanger 120. The method may then revert back to step 1504, and the recirculation pump and compressor may remain on until the control unit determines that the measured temperature in the chamber is within the predetermined temperature range.

In response to a determination at step 1506 that the measured temperature in the chamber is within the predetermined temperature range, the method may proceed to step 1510. At step 1510, the control unit may cause the recirculation pump and compressor to turn off. For example, control unit 130 may cause recirculation pump 124 to turn off and cease conveying water through the recirculation conduit. Control unit 130 may further cause compressor 118 to turn off and cease conveying refrigerant to heat exchanger 120.

From step 1510, the method may then revert back to step 1504, and the recirculation pump may remain off until the control unit determines that the measured oxygenation level in the chamber is not within the predetermined oxygenation range. By such a configuration, the control unit may continue to monitor the temperature of the chamber after it has initially been cooled. The monitoring may be continuous or may be intermittent. For example, step 1504 may be performed at predetermined time intervals. In some embodiments, monitoring may be continuous while the recirculation pump and compressor are on and revert to intermittent when the recirculation pump and compressor are off, or vice versa.

Method 1500 may therefore allow the livewell system to be cooled to a desired temperature without constantly running the recirculation pump and compressor. In some embodiments in which an evaporator plate is operably coupled to the livewell tank, method 1500 may be simplified. For example, in such embodiments, the recirculation pump need not necessarily be run to achieve cooling as a condenser may convey cooled refrigerant to the evaporator plate. In such embodiments, the compressor would simply be toggled on and off as provided for by the steps of method 1500.

The foregoing methods 1100, 1200, 1300, 1400, and/or 1500 may form a fully integrated control logic of a comprehensive livewell control system that automatically controls various aspects of the livewell system for the operator. In some embodiments, one or more of methods 1100, 1200, 1300, 1400, and/or 1500 may be combined to provide comprehensive control of the livewell system. Upon initiation of the control logic by the operator, the livewell system may perform one or more of methods 1100, 1200, 1300, 1400, and/or 1500 sequentially and/or simultaneously.

For example, in response to a selection made by the operator via the user interface, the livewell system may perform either of methods 1100 or 1200 to fill the chambers of the livewell with water or with a combination of water and additive, respectively. Once the chambers are filled, the system may perform methods 1300, 1400, and/or 1500 to allow recirculation of the water from the chambers and to control one or both of the oxygenation level and the temperature of the water in the livewell. The methods may then continue to run without intervention by the operator to ensure that the fill level, additive ratio, temperature, and/or oxygenation level are maintained at desirable levels. The control logic of the livewell system may be run until the operator elects to drain the chambers, thereby providing control of the livewell system throughout entire fishing sessions and/or competitions.

With the aforementioned methods, the operator need not adjust valves or open and/or close any ports to fill, recirculate, or drain the livewell system. Rather, the foregoing functions may be available to the operator simply by making a selection on the user interface.

Figure 16:
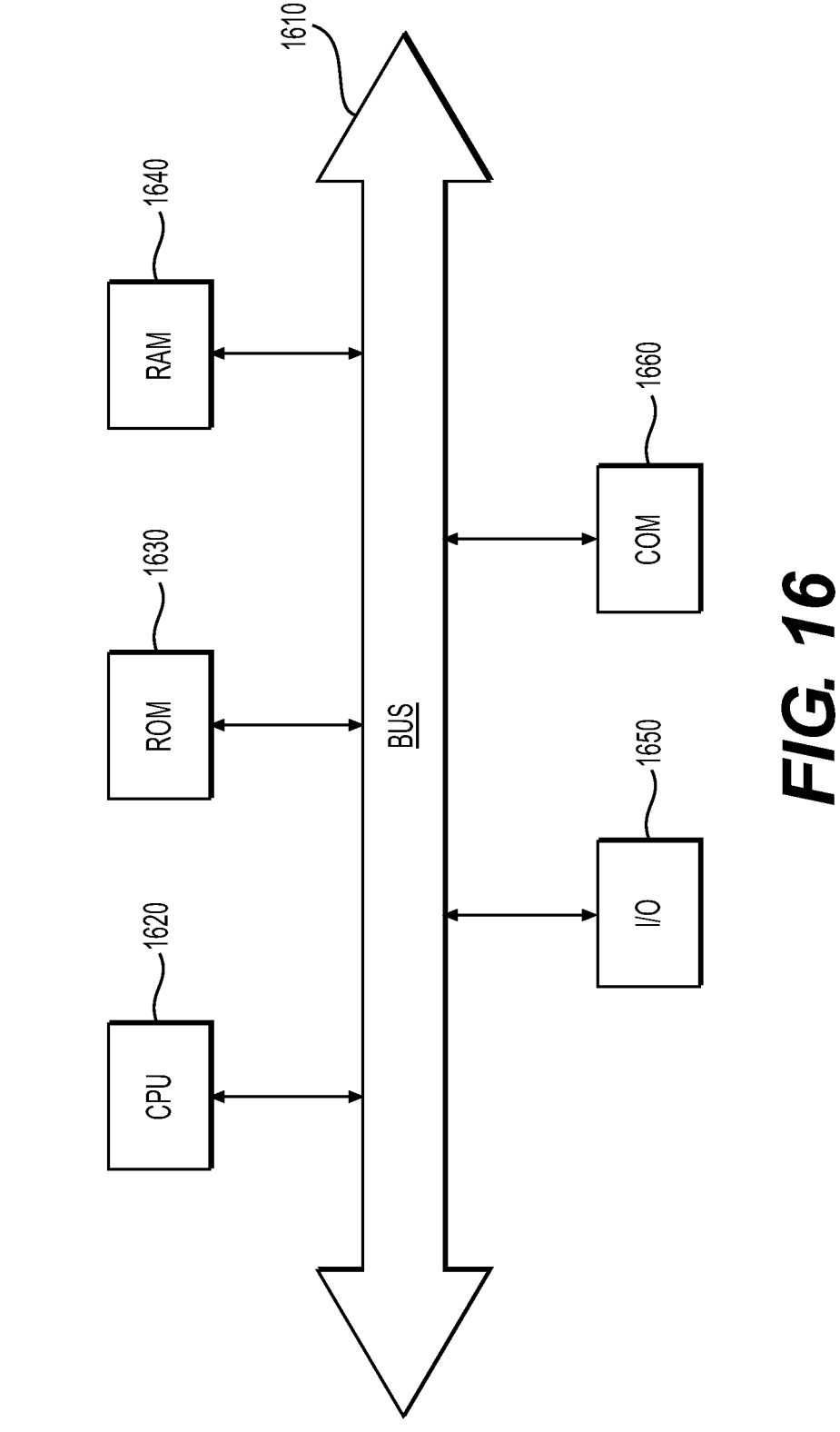
FIG. 16 depicts an example system that may execute techniques presented herein.

FIG. 16 depicts an example system that may execute techniques described herein. FIG. 16 is a simplified functional block diagram of a computer that may be configured to execute techniques described herein, according to exemplary embodiments of the present disclosure. FIG. 16 may, for example, represent configurations of the control units described herein previously. Specifically, the computer (or "platform" as it may not be a single physical computer infrastructure) may include a data communication interface 1660 for packet data communication. The platform may also include a central processing unit ("CPU") 1620, in the form of one or more processors, for executing program instructions. The platform may include an internal communication bus 1610, and the platform may also include a program storage and/or a data storage for various data files to be processed and/or communicated by the platform, such as ROM 1630 and RAM 1640, although the system 1600 may receive programming and data via network communications. The system 1600 also may include input and output ports 1650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones, multi-processor systems, microprocessor-based or programmable consumer electronics, network PCs, mini-computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

For purposes of this disclosure, directional terms such as "top," "bottom," "above," "below," or other variations thereof should be understood in the context of a vessel oriented ordinarily in a body of water. For example, the "top" of the vessel should be understood as the portion of the vessel out of the water and farthest away from the surface of the water in the above-the-water direction, whereas the "bottom" of the vessel should be understood as the portion of the vessel most deeply submerged beneath the surface of the water.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A livewell system, comprising:

a livewell tank including a tank body having a first chamber, a first opening, and a first lid configured to move between a closed configuration in which the first lid seals the first opening and an open configuration in which the first opening is unsealed to allow access to the first chamber;

a user interface;

an intake pump configured to selectively convey water from outside of the livewell tank into the first chamber;

a drain conduit in fluid communication with the first chamber and extending higher than a top of the first chamber, wherein the drain conduit is configured to permit excess water or gas to escape from the first chamber;

a fill sensor positioned within the drain conduit and higher than the top of the first chamber; and a control unit including a processor and a memory storing instructions, wherein the processor is configured to execute the instructions to:

receive, from the user interface, a fill signal; and cause, in response to the fill signal, the intake pump to convey water into the first chamber until a water-level signal is received from the fill sensor indicating that the first chamber is full such that the first lid is in direct contact with the water in the first chamber, the drain conduit is filled to at least a position of the fill sensor, and a column of water is formed in the drain conduit;

wherein the livewell system further comprises a timer operatively coupled to one or more of the controller and the intake pump;

wherein the intake pump is configured to continue conveying water into the first chamber after the first chamber is full for a first time period.

2. The livewell system of claim 1, wherein the tank body of the livewell tank includes:

a wall having an inwardly facing surface and an outwardly facing surface; and an insulating foam positioned against the outwardly facing surface of the wall.

3. The livewell system of claim 1, wherein the livewell tank further includes a second chamber, a second opening, and a second lid configured to move between a closed configuration in which the second lid seals the second opening and an open configuration in which the second opening is unsealed to allow access to the second chamber.

4. The livewell system of claim 3, wherein the first chamber is in fluid communication with the second chamber.

5. The livewell system of claim 3, wherein the processor is further configured to execute the instructions to cause, in response to the fill signal, the intake pump to convey water into the second chamber until the second chamber is full such that the second lid is in direct contact with the water in the second chamber.

6. The livewell system of claim 1, wherein the livewell tank further includes baffling positioned toward an upper end of the first chamber, wherein the baffling is submerged when the first chamber is full.

7. The livewell system of claim 1, wherein after the intake pump conveys water into the first chamber until the first chamber is full, the first chamber is substantially free of air.

8. The livewell system of claim 1, wherein the processor is further configured to execute the instructions to cause, in response to the water-level signal and after the first time period, the intake pump to cease conveying water into the first chamber.

9. The livewell system of claim 1, wherein the first time period is 1 second to 30 seconds.

10. The system of claim 1, further comprising:
an additive reservoir configured to contain an additive; and
an additive device configured to selectively convey the additive into the first chamber;
wherein the processor is further configured to execute the instructions to:
while the intake pump is conveying water into the first chamber, cause the additive device to convey additive into the first chamber to form a mixture of water and additive.

11. The system of claim 1, further comprising:
a recirculation conduit in fluid communication with the first chamber; and
a recirculation pump configured to selectively circulate fluid from the first chamber into the recirculation conduit and back into the first chamber.

12. The system of claim 11, wherein the processor is further configured to execute the instructions to:
receive a recirculation signal; and
in response to the recirculation signal, cause the recirculation pump to circulate the fluid through the recirculation conduit.

13. A method of operating a livewell system including a livewell tank including a tank body having a first chamber, a first opening, and a first lid configured to move between a closed configuration in which the first lid seals the first opening and an open configuration in which the first opening is unsealed to allow access to the first chamber, wherein the livewell system further includes a drain conduit in fluid communication with the first chamber and extending higher than a top of the first chamber, wherein the drain conduit is configured to permit excess water or gas to escape from the first chamber, wherein the livewell system further includes a fill sensor positioned within the drain conduit and higher than the top of the first chamber, and a timer, the method comprising:
receiving, by a control unit from a user interface, a fill signal;
causing, by the control unit in response to the fill signal, an intake pump to convey water into the first chamber until a water-level signal is received from the fill sensor indicating that the first chamber is full such that the first lid is in direct contact with the water in the first chamber, the drain conduit is filled to at least a position of the fill sensor, and a column of water is formed in the drain conduit; and
causing, by the control unit, the intake pump to convey water into the first chamber after the first chamber is full for a first time period measured by the timer.

14. The method of claim 13, wherein the livewell tank further includes a second chamber, a second opening, and a second lid configured to move between a closed configuration in which the second lid seals the second opening and an open configuration in which the second opening is unsealed to allow access to the second chamber.

15. The method of claim 14, further comprising:
causing, by the control unit in response to the fill signal, the intake pump to convey water into the second chamber until the second chamber is full such that the second lid is in direct contact with the water in the second chamber.

16. The method of claim 13, further comprising:
causing, by the controller in response to the water-level signal, the intake pump to cease conveying water into the first chamber.

17. A livewell system, comprising:
a livewell tank including a tank body having a first chamber, a first opening in the tank body, and a first lid configured to move between a closed configuration in which the first lid seals the first opening and an open configuration in which the first opening is unsealed, wherein the tank body and first lid define a first chamber in the closed configuration;
a user interface;
a high-speed pick-up positioned on an exterior of a vessel and configured to be submerged in a body of water;
an intake conduit extending from the high-speed pick-up to the first chamber;
an intake pump positioned along the intake conduit and configured to transition between an off state and an on state in which the intake pump conveys water ingested through the high-speed pick-up into the first chamber, wherein the intake conduit is configured such that water enters the first chamber only when the intake pump is in the on state, and wherein the high-speed pick-up and the intake conduit are configured to maintain the intake pump in a primed state when the livewell system is moving relative to the body of water;
a drain conduit in fluid communication with the first chamber and extending higher than a top of the first chamber, wherein the drain conduit is configured to permit excess water or gas to escape from the first chamber;
a fill sensor positioned within the drain conduit and higher than the top of the first chamber;
a control unit including a processor and a memory storing instructions, wherein the processor is configured to execute the instructions to:
receive, from the user interface, a fill signal; and
cause, in response to the fill signal, the intake pump to transition from the off state to the on state until a water-level signal is received from the fill sensor indicating that the drain conduit is filled to at least a position of the fill sensor and a column of water is formed in the drain conduit;
wherein the livewell system further comprises a timer operatively coupled to one or more of the controller and the intake pump;

wherein the intake pump is configured to continue conveying water into the first chamber after the first chamber is full for a first time period, thereby causing the column of water to form in the drain conduit.

18. The livewell system of claim 17, wherein the tank body of the livewell tank includes:

a wall having an inwardly facing surface and an outwardly facing surface; and an insulating foam positioned against the outwardly facing surface of the wall.

19. The livewell system of claim 17, wherein the livewell tank further includes a second chamber, a second opening, and a second lid configured to move between a closed configuration in which the second lid seals the second opening and an open configuration in which the second opening is unsealed to allow access to the second chamber.

20. The livewell system of claim 19, wherein the processor is further configured to execute the instructions to cause, in response to the fill signal, the intake pump to transition from the off state to the on state to allow water into the second chamber until the second chamber is full such that the second lid is in direct contact with the water in the second chamber.

21. The livewell system of claim 17, wherein the livewell tank further includes baffling positioned toward an upper end of the first chamber, wherein the baffling is submerged when the first chamber is full.

22. The livewell system of claim 17, wherein the processor is further configured to execute the instructions to cause, in response to the water-level signal, the intake pump to transition from the on state to the off state.

23. The livewell system of claim 17, wherein the first time period is 1 second to 30 seconds.

\* \* \* \* \*